(12) United States Patent
Sakai

(10) Patent No.: US 9,875,056 B2
(45) Date of Patent: Jan. 23, 2018

(54) INFORMATION PROCESSING SYSTEM, CONTROL PROGRAM, AND CONTROL METHOD

(71) Applicant: FUJITSU LIMITED, Kawasaki-shi, Kanagawa (JP)

(72) Inventor: Atsushi Sakai, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 269 days.

(21) Appl. No.: 14/549,875

(22) Filed: Nov. 21, 2014

(65) Prior Publication Data
US 2015/0169239 A1 Jun. 18, 2015

(30) Foreign Application Priority Data
Dec. 17, 2013 (JP) .................................. 2013-260020

(51) Int. Cl.
G06F 3/06 (2006.01)
G06F 9/455 (2006.01)

(52) U.S. Cl.
CPC ........ G06F 3/0647 (2013.01); G06F 9/45558 (2013.01); *G06F 2009/4557* (2013.01)

(58) Field of Classification Search
None
See application file for complete search history.

(56) References Cited

U.S. PATENT DOCUMENTS 7,680,919 B2* 3/2010 Nelson ................ G06F 9/45558
709/223

8,117,613 B2* 2/2012 Uyeda .................. G06F 9/4856
718/1

(Continued)

FOREIGN PATENT DOCUMENTS

JP 2004-530196 9/2004
JP 2005-190057 7/2005

(Continued)

OTHER PUBLICATIONS

Japanese Office Action issued May 23, 2017 for corresponding Japanese Patent Application No. 2013-260020, with partial English Translation, 8 pages.

(Continued)

*Primary Examiner* — Brian Peugh
*Assistant Examiner* — Dustin Bone
(74) *Attorney, Agent, or Firm* — Fujitsu Patent Center

(57) ABSTRACT

An information processing system includes a plurality of physical machines, in each of which a virtual machine is constructed, and a migration processing unit that executes a migration process for moving a migration source virtual machine, constructed on a migration source physical machine, onto a migration destination physical machine during operation of the migration source virtual machine. The migration processing unit includes a memory data transfer processing unit that transfers first data stored in a first memory of the migration source virtual machine from the first memory to a second memory of the migration destination physical machine, transfers second data written in the first memory during the transfer to the second memory, and, when a transfer completion scheduled time for the first and second data exceeds an allowed time, restricts writing executed on the first memory.

16 Claims, 35 Drawing Sheets

(56) References Cited

U.S. PATENT DOCUMENTS

| | | | |
|---|---|---|---|
| 9,384,035 B2* | 7/2016 | Ito | G06F 9/4856 |
| 9,436,751 B1* | 9/2016 | Serebrin | G06F 17/30575 |
| 2002/0129085 A1 | 9/2002 | Kubala et al. | |
| 2005/0144380 A1 | 6/2005 | Suzuki et al. | |
| 2010/0094948 A1* | 4/2010 | Ganesh | G06F 9/4856 709/212 |
| 2012/0221710 A1* | 8/2012 | Tsirkin | G06F 9/5077 709/224 |
| 2013/0185719 A1* | 7/2013 | Kar | G06F 9/45558 718/1 |
| 2013/0326175 A1* | 12/2013 | Tsirkin | G06F 9/45558 711/162 |
| 2013/0326177 A1* | 12/2013 | Oiwa | G06F 3/0647 711/162 |
| 2014/0108854 A1* | 4/2014 | Antony | G06F 11/203 714/4.2 |
| 2014/0298338 A1* | 10/2014 | Doi | G06F 9/4856 718/1 |
| 2015/0149999 A1* | 5/2015 | Ramanathan | G06F 9/4856 718/1 |

FOREIGN PATENT DOCUMENTS

| | | |
|---|---|---|
| JP | 2011-039790 | 2/2011 |
| JP | 2013-047920 | 3/2013 |
| JP | 2013-250950 A | 12/2013 |
| WO | 2013/105217 A1 | 7/2013 |

OTHER PUBLICATIONS

Japanese Office Action dated Nov. 14, 2017 for corresponding Japanese Patent Application No. 2013-260020, with English Translation, 7 pages.

* cited by examiner

FIG. 19

MEMORY ALLOCATION TABLE

| VIRTUAL ADDRESS | PHYSICAL ADDRESS | ATTRIBUTE |
|---|---|---|
| V-ADD-0 | P-ADD-a | 0 |
| V-ADD-1 | P-ADD-b | 0 |
| V-ADD-2 | P-ADD-c | 0 |
| V-ADD-3 | P-ADD-d | 0 |

FIG. 20

MEMORY SPACE UPDATE TABLE

| VIRTUAL ADDRESS | DIRTY BIT |
|---|---|
| V-ADD-0 | 0 |
| V-ADD-1 | 0 |
| V-ADD-2 | 0 |
| V-ADD-3 | 0 |

DIRTY PAGE NUMBER MANAGEMENT TABLE

| UNIT TIME | NUMBER OF DIRTY PAGES |
|---|---|
| $t_0$ | 10 |
| $t_1$ | 14 |
| $t_2$ | 11 |

FIG. 23

UPON START OF TRANSFER OF V-ADD-0

MEMORY SPACE UPDATE TABLE

| VIRTUAL ADDRESS | DIRTY BIT |
|---|---|
| V-ADD-0 | 0 |
| V-ADD-1 | 0 |
| V-ADD-2 | 0 |
| V-ADD-3 | 0 |

MEMORY ALLOCATION TABLE

| VIRTUAL ADDRESS | PHYSICAL ADDRESS | ATTRIBUTE |
|---|---|---|
| V-ADD-0 | P-ADD-a | 1→0 |
| V-ADD-1 | P-ADD-b | 1 |
| V-ADD-2 | P-ADD-c | 1 |
| V-ADD-3 | P-ADD-d | 1 |

DIRTY PAGE NUMBER MANAGEMENT TABLE

| UNIT TIME | NUMBER OF DIRTY PAGES |
|---|---|
| $t_0$ | 0 |

FIG. 24

UPON START OF TRANSFER OF V-ADD-1

MEMORY SPACE UPDATE TABLE

| VIRTUAL ADDRESS | DIRTY BIT |
|---|---|
| V-ADD-0 | 0 |
| V-ADD-1 | 0 |
| V-ADD-2 | 0 |
| V-ADD-3 | 0 |

MEMORY ALLOCATION TABLE

| VIRTUAL ADDRESS | PHYSICAL ADDRESS | ATTRIBUTE |
|---|---|---|
| V-ADD-0 | P-ADD-a | 0 |
| V-ADD-1 | P-ADD-b | 1→0 |
| V-ADD-2 | P-ADD-c | 1 |
| V-ADD-3 | P-ADD-d | 1 |

DIRTY PAGE NUMBER MANAGEMENT TABLE

| UNIT TIME | NUMBER OF DIRTY PAGES |
|---|---|
| $t_0$ | 0 |

FIG. 25

UPON TRANSFER OF V-ADD-1 (UPON WRITING OF V-ADD-1)

MEMORY ALLOCATION TABLE

| VIRTUAL ADDRESS | PHYSICAL ADDRESS | ATTRIBUTE |
|---|---|---|
| V-ADD-0 | P-ADD-a | 0 |
| V-ADD-1 | P-ADD-b →P-ADD-f | 0→1 |
| V-ADD-2 | P-ADD-c | 1 |
| V-ADD-3 | P-ADD-d | 1 |

MEMORY SPACE UPDATE TABLE

| VIRTUAL ADDRESS | DIRTY BIT |
|---|---|
| V-ADD-0 | 0 |
| V-ADD-1 | 0→1 |
| V-ADD-2 | 0 |
| V-ADD-3 | 0 |

DIRTY PAGE NUMBER MANAGEMENT TABLE

| UNIT TIME | NUMBER OF DIRTY PAGES |
|---|---|
| $t_0$ | 0→1 |

FIG. 26

UPON START OF TRANSFER OF V-ADD-2

MEMORY ALLOCATION TABLE

| VIRTUAL ADDRESS | PHYSICAL ADDRESS | ATTRIBUTE |
|---|---|---|
| V-ADD-0 | P-ADD-a | 0 |
| V-ADD-1 | P-ADD-f | 1 |
| V-ADD-2 | P-ADD-c | 1→0 |
| V-ADD-3 | P-ADD-d | 1 |

MEMORY SPACE UPDATE TABLE

| VIRTUAL ADDRESS | DIRTY BIT |
|---|---|
| V-ADD-0 | 0 |
| V-ADD-1 | 1 |
| V-ADD-2 | 0 |
| V-ADD-3 | 0 |

DIRTY PAGE NUMBER MANAGEMENT TABLE

| UNIT TIME | NUMBER OF DIRTY PAGES |
|---|---|
| $t_0$ | 1 |

FIG. 27

UPON START OF TRANSFER OF V-ADD-3

MEMORY ALLOCATION TABLE

| VIRTUAL ADDRESS | PHYSICAL ADDRESS | ATTRIBUTE |
|---|---|---|
| V-ADD-0 | P-ADD-a | 0 |
| V-ADD-1 | P-ADD-f | 1 |
| V-ADD-2 | P-ADD-c | 0 |
| V-ADD-3 | P-ADD-d | 1→0 |

MEMORY SPACE UPDATE TABLE

| VIRTUAL ADDRESS | DIRTY BIT |
|---|---|
| V-ADD-0 | 0 |
| V-ADD-1 | 1 |
| V-ADD-2 | 0 |
| V-ADD-3 | 0 |

DIRTY PAGE NUMBER MANAGEMENT TABLE

| UNIT TIME | NUMBER OF DIRTY PAGES |
|---|---|
| $t_0$ | 1 |

FIG. 28

UPON TRANSFER OF V-ADD-3 (UPON WRITING OF V-ADD-0)

MEMORY SPACE UPDATE TABLE

| VIRTUAL ADDRESS | DIRTY BIT |
|---|---|
| V-ADD-0 | 0→1 |
| V-ADD-1 | 1 |
| V-ADD-2 | 0 |
| V-ADD-3 | 0 |

MEMORY ALLOCATION TABLE

| VIRTUAL ADDRESS | PHYSICAL ADDRESS | ATTRIBUTE |
|---|---|---|
| V-ADD-0 | P-ADD-a →P-ADD-e | 0→1 |
| V-ADD-1 | P-ADD-f | 1 |
| V-ADD-2 | P-ADD-c | 0 |
| V-ADD-3 | P-ADD-d | 0 |

DIRTY PAGE NUMBER MANAGEMENT TABLE

| UNIT TIME | NUMBER OF DIRTY PAGES |
|---|---|
| $t_0$ | 1→2 |

FIG. 32

UPON TRANSFER IN UNIT TIME $T_3$ (1)

TRANSFER MEMORY SPACE NUMBER MANAGEMENT TABLE

| UNIT TIME | NUMBER OF TRANSFERRED MEMORY SPACES | AMOUNT OF TRANSFERRED DATA (KB) |
|---|---|---|
| $t_0$ | 10 | 40 |
| $t_1$ | 9 | 36 |
| $t_2$ | 11 | 44 |
| $t_3$ | 3 (IN PROCESS OF ADDING UP) | 12 (IN PROCESS OF ADDING UP) |

DIRTY PAGE NUMBER MANAGEMENT TABLE

| UNIT TIME | NUMBER OF DIRTY PAGES |
|---|---|
| $t_0$ | 4 |
| $t_1$ | 6 |
| $t_2$ | 5 |
| $t_3$ | 2 (IN PROCESS OF ADDING UP) |

FIG. 33

UPON TRANSFER IN UNIT TIME $T_3$ (2)

TRANSFER MEMORY SPACE NUMBER MANAGEMENT TABLE

| UNIT TIME | NUMBER OF TRANSFERRED MEMORY SPACES | AMOUNT OF TRANSFERRED DATA (KB) |
|---|---|---|
| $t_0$ | 10 | 40 |
| $t_1$ | 9 | 36 |
| $t_2$ | 11 | 44 |
| $t_3$ | 9 (IN PROCESS OF ADDING UP) | 36 |

DIRTY PAGE NUMBER MANAGEMENT TABLE

| UNIT TIME | NUMBER OF DIRTY PAGES |
|---|---|
| $t_0$ | 4 |
| $t_1$ | 6 |
| $t_2$ | 5 |
| $t_3$ | 9 (IN PROCESS OF ADDING UP) |

INFORMATION PROCESSING SYSTEM, CONTROL PROGRAM, AND CONTROL METHOD

CROSS-REFERENCE TO RELATED APPLICATION

This application is based upon and claims the benefit of priority of the prior Japanese Patent Application No. 2013-260020, filed on Dec. 17, 2013, the entire contents of which are incorporated herein by reference.

FIELD

The present invention relates to an information processing system, a control program, and a control method.

BACKGROUND

A cloud computing service virtualizes a group of hardware such as a plurality of servers of a server facility on the basis of the service agreement with a user and then provides the user with the infrastructure itself of the virtual machines and networks as a service to be provided through a network. This type of cloud computing service allows virtualization software (hypervisor) to allocate physical servers (or physical machines) to the plurality of virtual machines to enable service provision through an application program installed in each of the virtual machines. Thus, the plurality of virtual machines are allocated respectively to the plurality of physical servers deployed in the server facility.

Migration, particular live migration, is the technology of moving a virtual machine from a physical server to another physical server without disconnecting the service by an application. Live migration is a vital function in a cloud computing service. For instance, in a case where the number of accesses to a web system by virtual machines on a certain physical server becomes more than expected, and consequently the utilization of the CPU of the physical server by the virtual machines reaches 100% due to the high load of the virtual machines, the virtual machines or other virtual machines need to be moved to another physical server with more capacity. Live migration is taken advantage of in such a case in order to distribute the load of the plurality of virtual machines. Furthermore, in a case where a physical server needs to be restarted, live migration is utilized in order to move the virtual machines on this physical server to another physical server.

Live migration is one of the functions provided in virtualization software. In response to an instruction on live migration from a management server, the virtualization software secures a memory space in a destination physical machine and copies the memory contents to be moved of a source virtual machine to the memory of the destination physical machine via a network. This consequently synchronizes the memory contents of the source virtual machine with the memory content of the destination virtual machine. Then the virtualization software suspends the source virtual machine, resumes the destination virtual machine, and transfers the data on the hard disk to the destination virtual machine. Finally, the memory contents of the source virtual machine are deleted from a source physical machine, completing the process.

Examples of the migration are disclosed in Japanese National Publication of International Patent Application No. 2004-530196, Japanese Patent Application Laid-Open No. 2013-047920, Japanese Patent Application Laid-Open No. 2005-190057, and Japanese Patent Application Laid-Open No. 2011-039790.

SUMMARY

Most of the time required for live migration is also required for copying memory contents. Because memory contents are copied without suspending the source virtual machine, the source virtual machine newly writes data into the memory during this copy process, and this newly updated contents are further copied. This copy process is repeated until the volume of the updated data reaches substantially zero. For this reason, reducing the amount of time required for copying memory contents effectively helps reduce the time required for live migration.

In the past, it only took a short period of time to copy memory contents due to a low memory capacity supported by the OS, sufficient network bandwidth in a server facility, and low load of an application program on a virtual machine.

In recent years, however, some OS's support memory capacities exceeding a terabyte, and the technology of online databases that can expand databases on a memory has appeared. Furthermore, the enlarged server facility had resulted in narrowing the network bandwidths, and the increased load of applications causes more frequent updates of data during copying. These facts are likely to increase the amount of time required for copying memory contents, and hence the amount of time required for live migration.

One aspect of the embodiment is an information processing system, comprising:

a plurality of physical machines, in each of which a virtual machine is constructed; and a migration processing unit that executes a migration process for moving a migration source virtual machine, constructed on a migration source physical machine, onto a migration destination physical machine during operation of the migration source virtual machine, wherein the migration processing unit has a memory data transfer processing unit that transfers first data stored in a first memory of the migration source virtual machine from the first memory to a second memory of the migration destination physical machine, transfers second data, which is written in the first memory during transferring the first data, from the first memory to the second memory, and, when a transfer completion scheduled time for the first and second data exceeds an allowed time, restricts writing the second data in the first memory.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 19 is a diagram illustrating an example of the memory allocation table.

FIG. 20 is a diagram illustrating examples of the memory space update table and the dirty page number management table.

FIG. 23 is a diagram illustrating examples of the memory allocation table, the memory space update table, and the dirty page number management table.

FIG. 24 is a diagram illustrating examples of the memory allocation table, the memory space update table, and the dirty page number management table.

FIG. 25 is a diagram illustrating examples of the memory allocation table, the memory space update table, and the dirty page number management table.

FIG. 26 is a diagram illustrating examples of the memory allocation table, the memory space update table, and the dirty page number management table.

FIG. 27 is a diagram illustrating examples of the memory allocation table, the memory space update table, and the dirty page number management table.

FIG. 28 is a diagram illustrating examples of the memory allocation table, the memory space update table, and the dirty page number management table.

FIG. 32 is a diagram illustrating examples of the dirty page number management table and the transfer memory space number management table.

FIG. 33 is a diagram illustrating examples of the dirty page number management table and the transfer memory space number management table.

DESCRIPTION OF EMBODIMENTS

[Configuration of Cloud Computing System]

Figure 1:
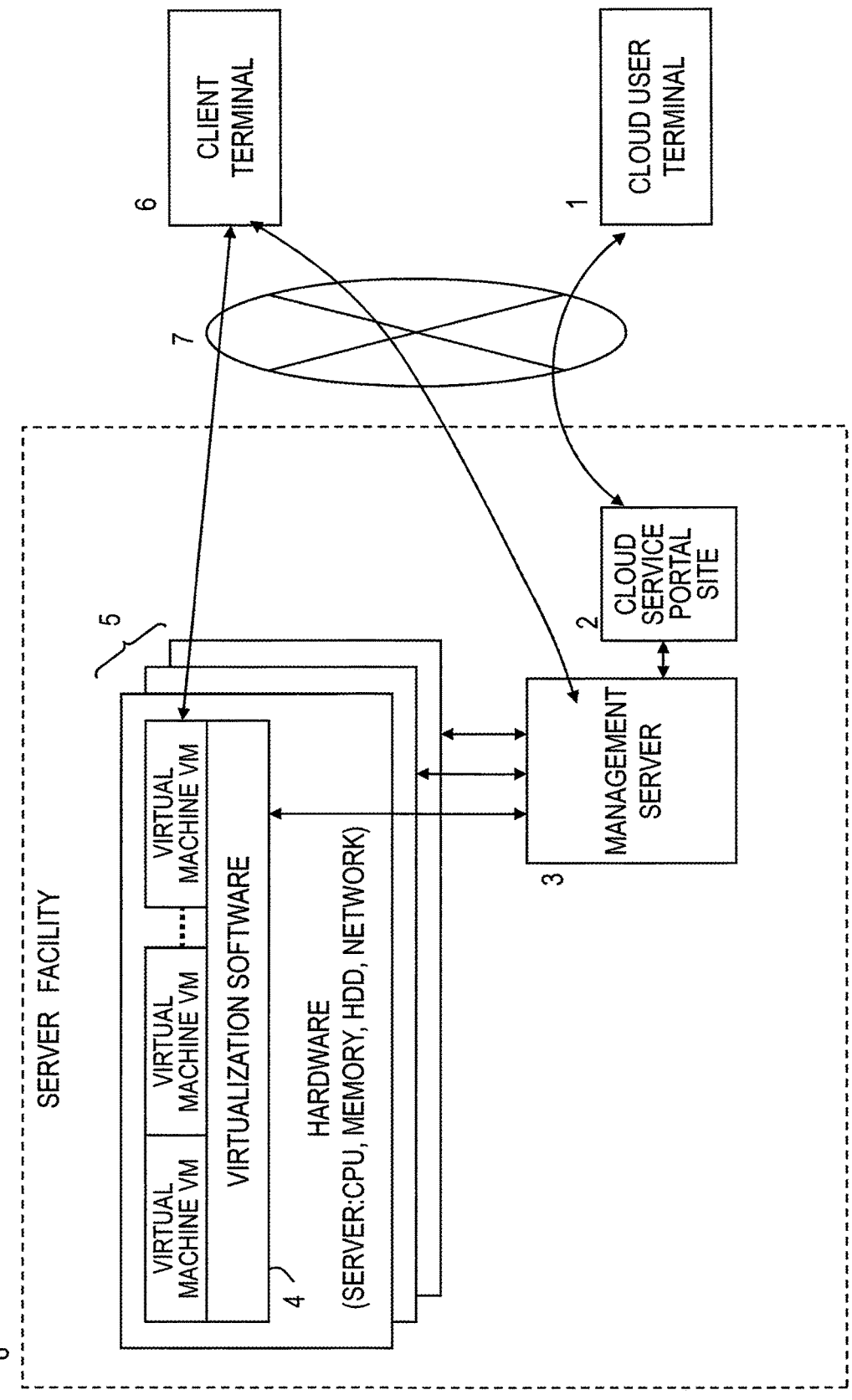
FIG. 1 is a diagram illustrating the entire configuration of a cloud computing system according to the present embodiment.

FIG. 1 is a diagram illustrating the entire configuration of a cloud computing system according to the present embodiment. A server facility 8 is provided a group of hardware 5, a cloud computing service portal site 2, and a management server 3. A cloud user terminal 1 and a client terminal receiving a service operated by a cloud user can be connected to the server facility 8 by a network 7 such as the Internet or an intranet.

The group of hardware 5 has a plurality of physical servers (or physical machines), each of which has a CPU, a memory (DRAM), a large-capacity memory such as a hard disk (HDD), and a network. Resources of the group of hardware 5 are allocated to a plurality of virtual machines VM. The cloud computing service portal site 2 and the management server 3 may be constructed by, for example, these virtual machines VM.

A cloud computing service provided to a cloud user by the cloud computing system is a service where the foundation itself for constructing and operating a computer system, i.e., an infrastructure itself for the virtual machines and the network, is provided via the network 7.

The cloud user accesses the cloud computing service portal site 2 from the terminal 1, selects specifications required for the virtual machines, such as a clock frequency of the CPU, memory capacity (GB), capacity of the hard disk (MB/sec, IOPS), and network bandwidth (Gbps), and signs a cloud computing service contract involving these selected specifications. The cloud user terminal 1 also accesses the cloud computing service portal site 2 to monitor the operating states of the virtual machines or control the operations of the virtual machines.

The management server 3 collaborates with a virtualization software (hypervisor) 4 to manage each of the physical servers contained in the group of hardware 5 and allocates the hardware to the virtual machines VM to construct and manage the virtual machines VM.

The virtualization software 4 is infrastructure software that allocates the CPUs, memories, hard disks and networks of the physical servers of the group of hardware 5 to operate the virtual machines in response to an instruction from the management server 3. The virtualization software 4 operates on, for example, the servers contained in the group of hardware 5.

The virtual machines VM not only are allocated the hardware described above but also have in the hard disk image files having an OS, middleware MW, application AP, and database DB. For example, each of the virtual machines VM writes the image files from the hard disk into the memory upon activation to execute an operation corresponding to a desired service.

The client terminal 6 is a terminal of a client who receives a service operated by the cloud user. The client terminal 6 normally accesses the virtual machines VM of the cloud user via the network 7 to receive the service operated by the cloud user.

An operator of the server facility monitors the load status of each of the physical servers by means of the management server 3, and sends an instruction on migration to the virtualization software 4 in order to transfer a virtual machine VM on an overloaded physical server to another physical server. Further, when transferring a virtual machine VM to another physical server for a different reason, the operator sends the instruction on migration to the virtualization software 4. In response to the instruction on migration, the virtualization software 4 executes a migration process on the virtual machine VM to be transferred.

Figure 2:
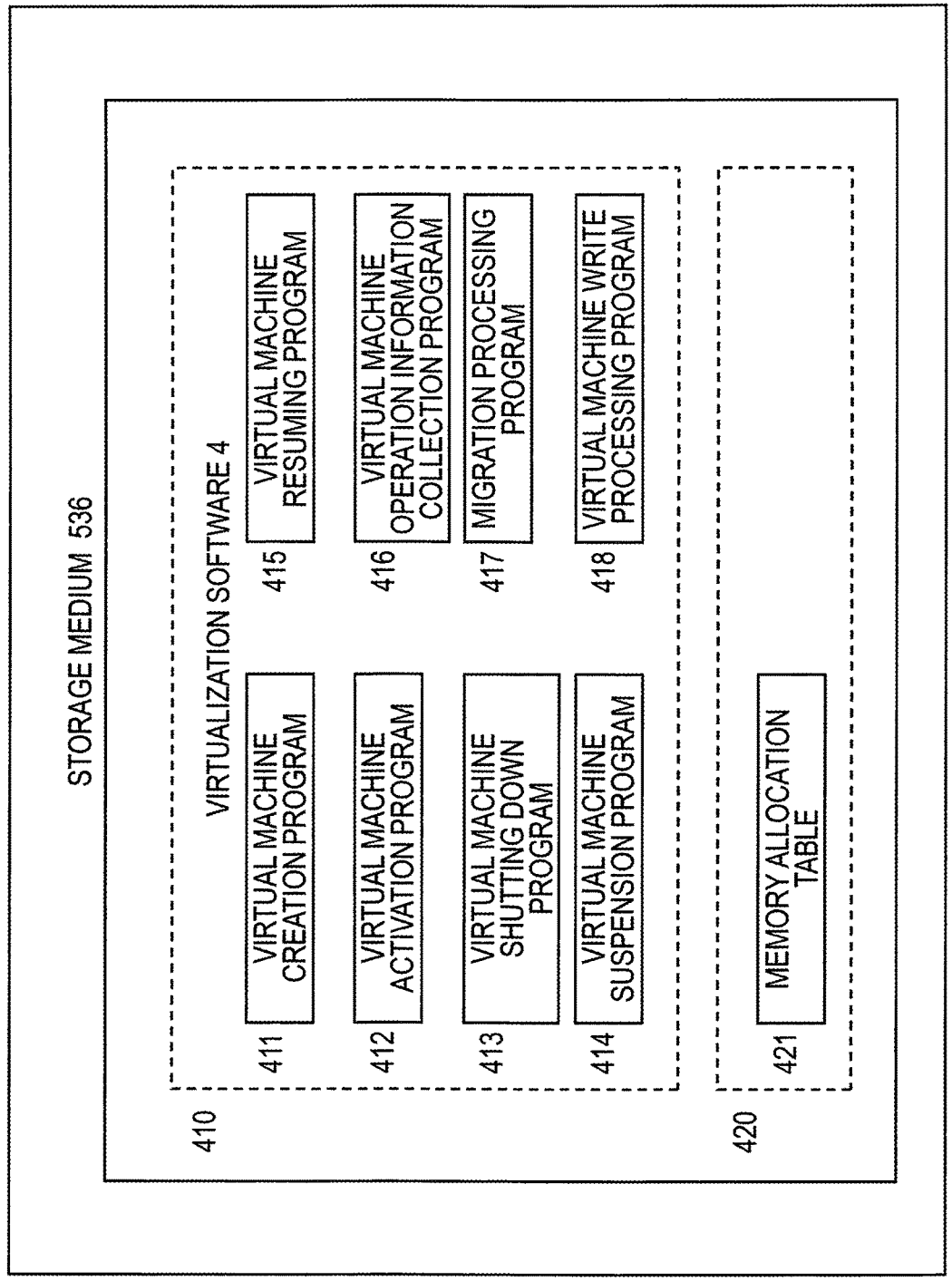
FIG. 2 is a diagram illustrating a configuration example of software provided in the group of hardware.

FIG. 2 is a diagram illustrating a configuration example of software provided in the group of hardware. In addition to the hardware such as a CPU (processor), which is not illustrated, the group of hardware 5 has a software storage area 410 for storing software (programs), and a table information storage area 420 for storing information constructing a table. Virtualization software 4 is stored in the software storage area 410 in the example illustrated in FIG. 2. Through execution by the CPU of a computer, the virtualization software 4 allocates the resources of the group of hardware 5 to the virtual machines VM to operate the virtual machines VM.

The programs stored in the software storage area 410 are executed by the CPU of the group of hardware 5, whereby, for example, a virtual machine creation program 411 for creating a virtual machine operates as a virtual machine creation unit, a virtual machine activation program 412 for activating the virtual machine operates as a virtual machine activation unit, a virtual machine shutting down program 413 for shutting down the virtual machine operates as a virtual machine shutting down unit, a virtual machine suspension program 414 for temporarily stopping or suspending the activated virtual machine operates as a virtual machine suspension unit, a virtual machine resuming program 415 for restarting or resuming the suspended virtual machine operates as a virtual machine resuming unit, and a virtual machine operation information collection program 416 for collecting operation information on the virtual machine operates as a virtual machine operation information collection unit. The programs stored in the software storage area 410 are also executed by the CPU of the group of hardware 5, whereby, for example, a migration processing program 417 for carrying out a migration process for transferring a virtual machine from a physical server to another in response to a migration instruction from the management server 3, operates as a migration processing unit, and a virtual machine write processing program 418 for carrying out a memory writing process in response to a write request for writing data to a memory space of a virtual machine operates as a virtual machine write processing unit. The memory writing process is described in detail with reference to FIGS. 16 and 21.

The table information storage area 420 stores information such as a memory allocation table 421 for storing the association between a virtual address and a physical address of a virtual machine VM. Note that the virtual address is a logical address allocated with respect to a process performed by the virtual machine, while the physical address is an address physically allocated to the memory.

Figure 3:
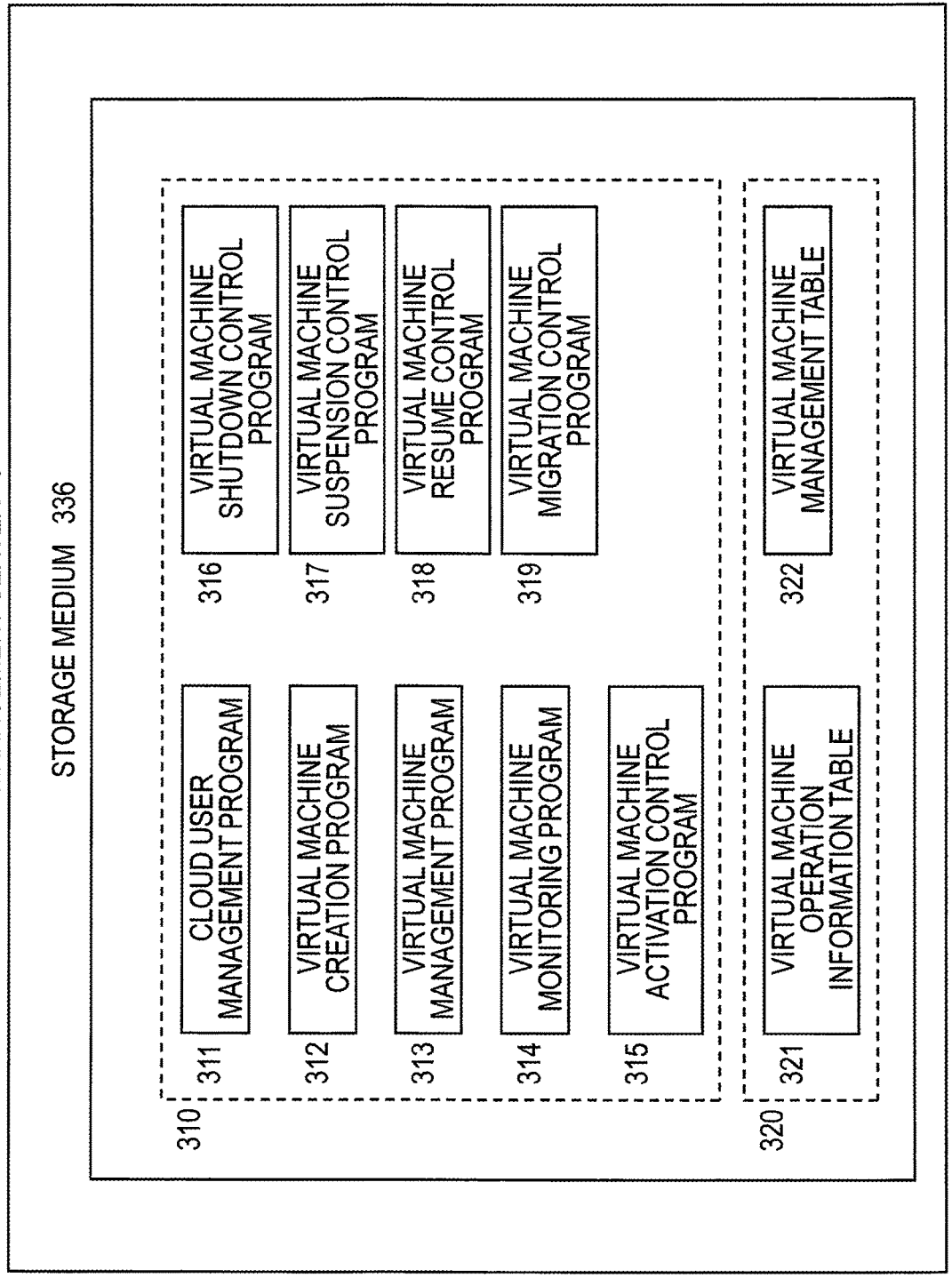
FIG. 3 is a diagram illustrating a configuration example of software provided in the management server.

FIG. 3 is a diagram illustrating a configuration example of software provided in the management server. In addition to the hardware such as a CPU (processor), which is not illustrated, the management server 3 has a storage medium 336. The storage medium 336 has a software storage area 310 for storing software (programs) and a table information management area 320 for storing information constructing a table.

The programs stored in the software storage area 310 are executed by the CPU of the management server 3, whereby, for example, a cloud user management program 311 for executing cloud user management such as charging a cloud user who signed a cloud contract in the cloud service portal site 2 operates as a cloud user management unit, a virtual machine creation program 312 for allocating the hardware resources based on the cloud contract to create the virtual machines VM operates as a virtual machine creation unit, a virtual machine management program 313 for managing the virtual machines operates as a virtual machine management unit, and a virtual machine monitoring program 314 for monitoring the operations of the virtual machines operates as a virtual machine monitoring unit.

The programs stored in the software storage area 310 are also executed by the CPU of the management server 3, whereby, for example, a virtual machine activation control program 315 for instructing the virtualization software 4 to activate the virtual machines operates as a virtual machine activation control unit, a virtual machine shutdown control program 316 for instructing the virtualization software 4 to shut down the activated virtual machines operates as a virtual machine shutdown control unit, a virtual machine suspension control program 317 for instructing the virtualization software 4 to suspend the activated virtual machines operates as a virtual machine suspension control unit, a virtual machine resume control program 318 for instructing the virtualization software 4 to resume the suspended virtual machines operates as a virtual machine resume control unit, and a virtual machine migration control program 319 for instructing the virtualization software 4 to migrate the virtual machines operates as a virtual machine migration control unit.

The table information management area 320 stores information such as a virtual machine operation information table 321 that includes the operation information of the virtual machines reported by the virtualization software 4, and a virtual machine management table 322 for managing the virtual machines, the cloud user, and the contract signed by the cloud user.

Figure 4:
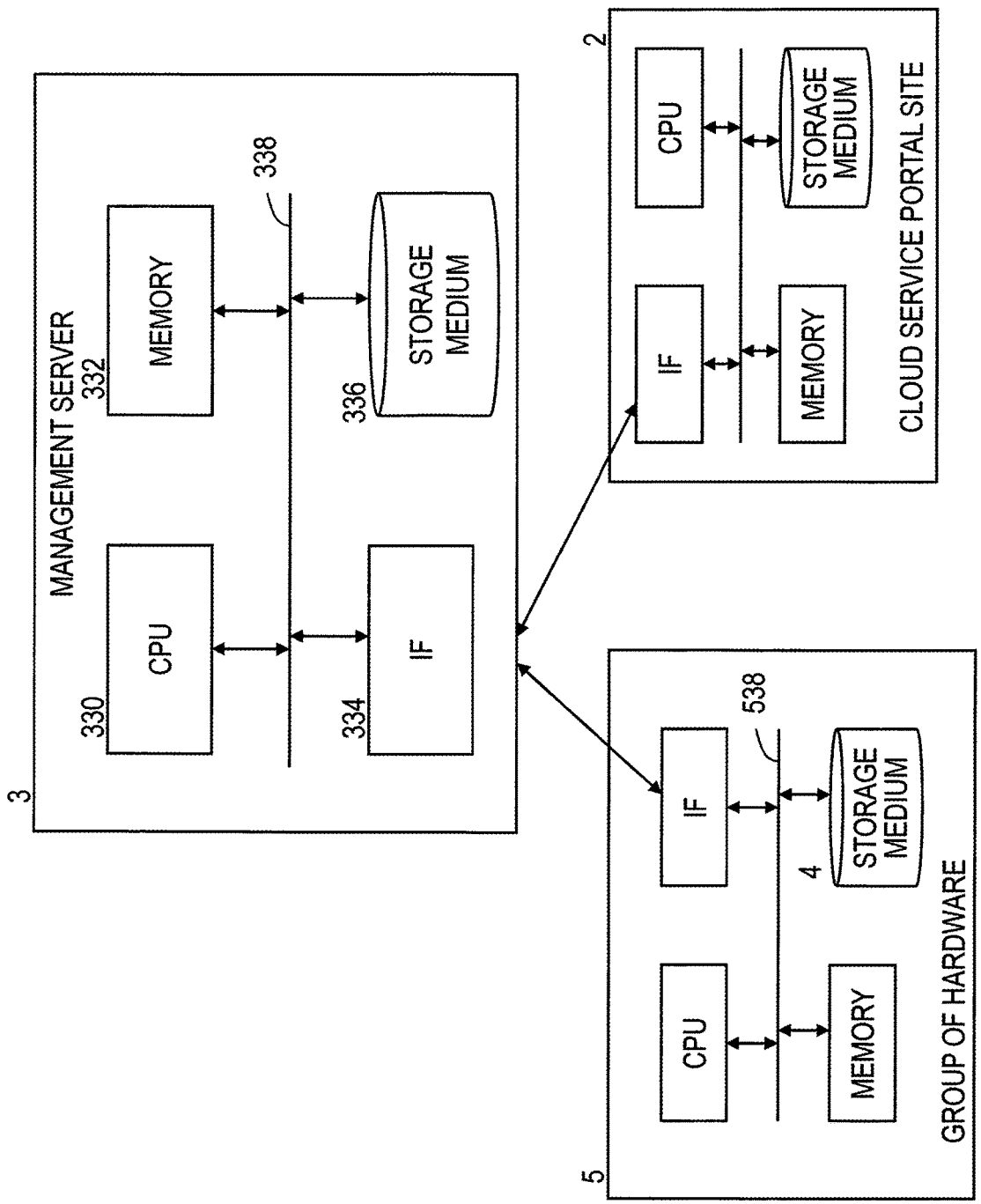
FIG. 4 is a diagram illustrating hardware configurations of the cloud computing service portal site, the management server, and the group of hardware in the server facility.

FIG. 4 is a diagram illustrating hardware configurations of the cloud computing service portal site, the management server, and the group of hardware in the server facility. The management server 3 has a CPU 330 functioning as a processor, a memory 332, an external interface 334, and a storage medium 336 for storing site control software and the like. These components of the management server 3 are connected to one another by a bus 338. Furthermore, the group of hardware 5 is a group of computers, each of which has, as with the management server 3, a CPU functioning as a processor, a memory, an external interface IF, and a storage medium for storing software and the like. The virtualization software 4 illustrated in FIG. 2 and the like are stored in each of the storage media of the group of hardware 5.

As with the management server 3, the cloud computing service portal site 2 has a CPU functioning as a processor, a memory, an external interface IF, and a storage medium for storing site control software and the like, and has these components connected to one another by a bus.

[Migration]

A migration process executed by the virtualization software 4 is described next. Here is described in particular a live migration process where a source virtual machine that is being operated on a source physical machine is moved to a destination physical machine without stopping the operation of the source virtual machine.

Figure 5:
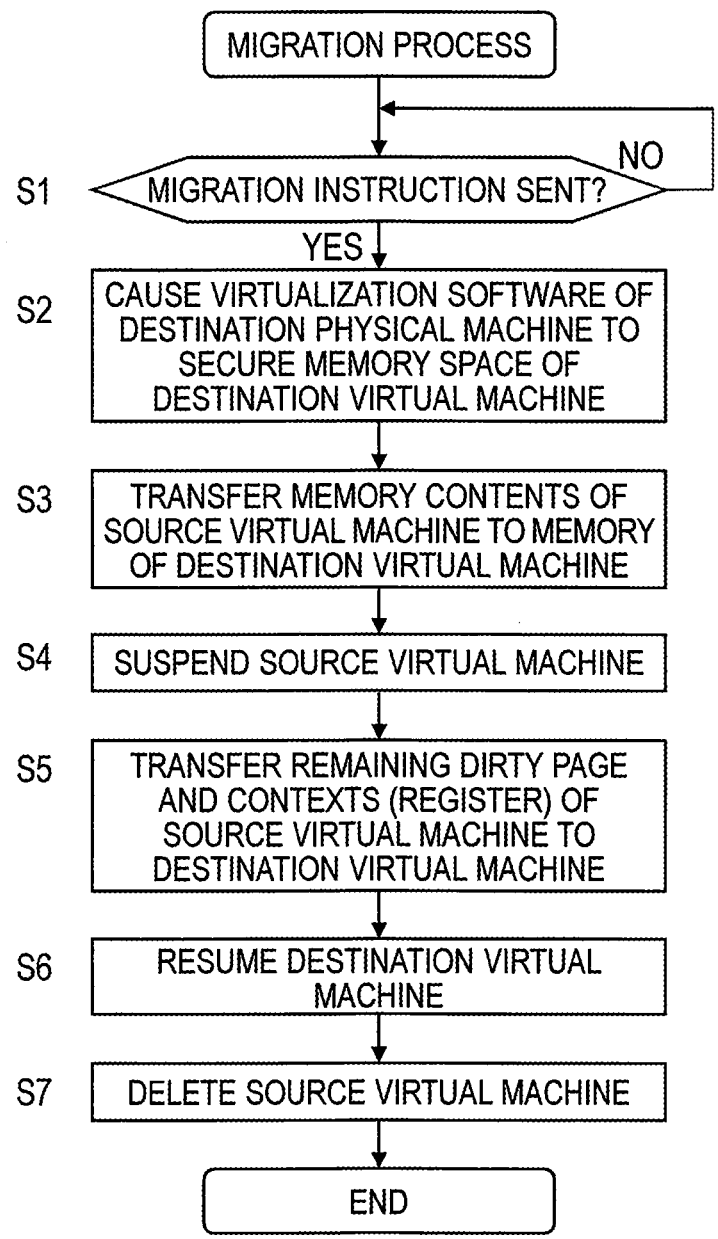
FIG. 5 is a flowchart illustrating the migration process executed by the virtualization software 4.

FIG. 5 is a flowchart illustrating the migration process executed by the virtualization software 4. FIGS. 6 to 9 are diagrams for explaining the migration process. The process illustrated in the flowchart of FIG. 5 is described hereinafter with reference to FIGS. 6 to 9.

In response to a migration instruction from the management server 3 (YES in S1), the virtualization software 4 executes a migration process. The migration instruction from the management server 3 includes information identifying a source physical machine and a source virtual machine (e.g., IP addresses), information identifying a destination physical machine and a destination virtual machine or information specifying any physical machine as the destination physical machine.

Figure 6:
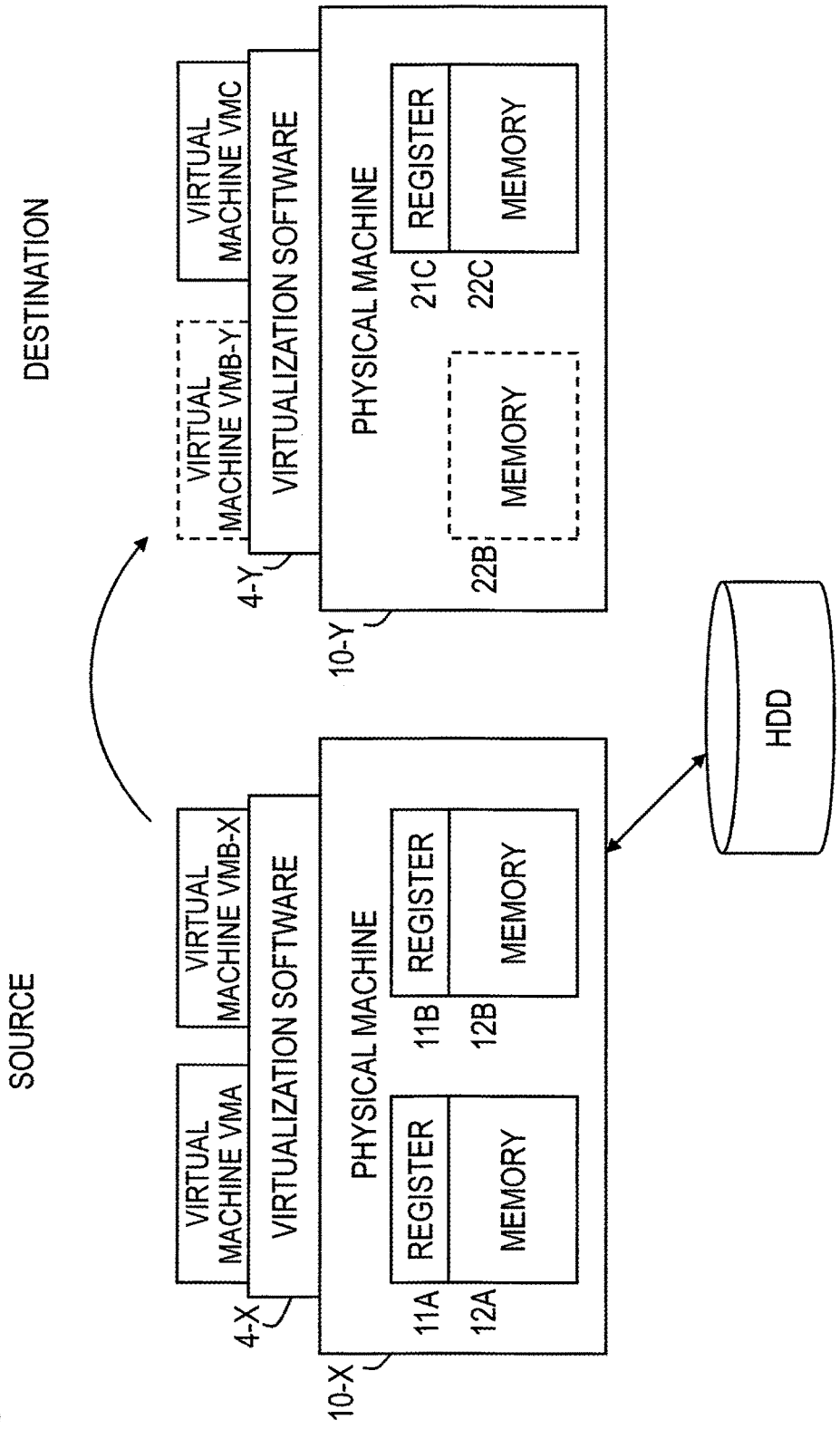
FIGS. 6 to 9 are diagrams for explaining the migration process.

As illustrated in FIG. 6, a source physical machine 10-X has two virtual machines VMA and VMB-X operated by virtualization software 4-X. The virtual machines VMA and VMB-X are allocated, respectively, memories 12A and 12B and registers 11A and 11B of the CPU in the physical machine 10-X. The source physical machine 10-X is connected to a hard disk HDD. The HDD is accessed by the virtual machines VMA, VMB-X. A destination physical machine 10-Y, on the other hand, has one virtual machine VMC operated by virtualization software 4-Y. A migration process is executed in which the source virtual machine VMB-X is moved from the source physical machine 10-X to the destination physical machine 10-Y.

Once the virtual machine VMB-X is activated, the OS, middleware and application in its hard disk HDD are downloaded onto the memory 12B. Once the virtual machine VMB-X is operated, its data are written to the register 11B and memory 12B of the CPU and read therefrom.

The virtualization software 4-X causes the virtualization software 4-Y of the destination physical machine to secure a memory space for the destination virtual machine (S2). As a result, a space for a memory 22B is secured in the memory of the destination physical machine 10-Y, as illustrated in FIG. 6, constructing a framework of a virtual machine VMB-Y in the destination physical machine 10-Y.

Figure 7:
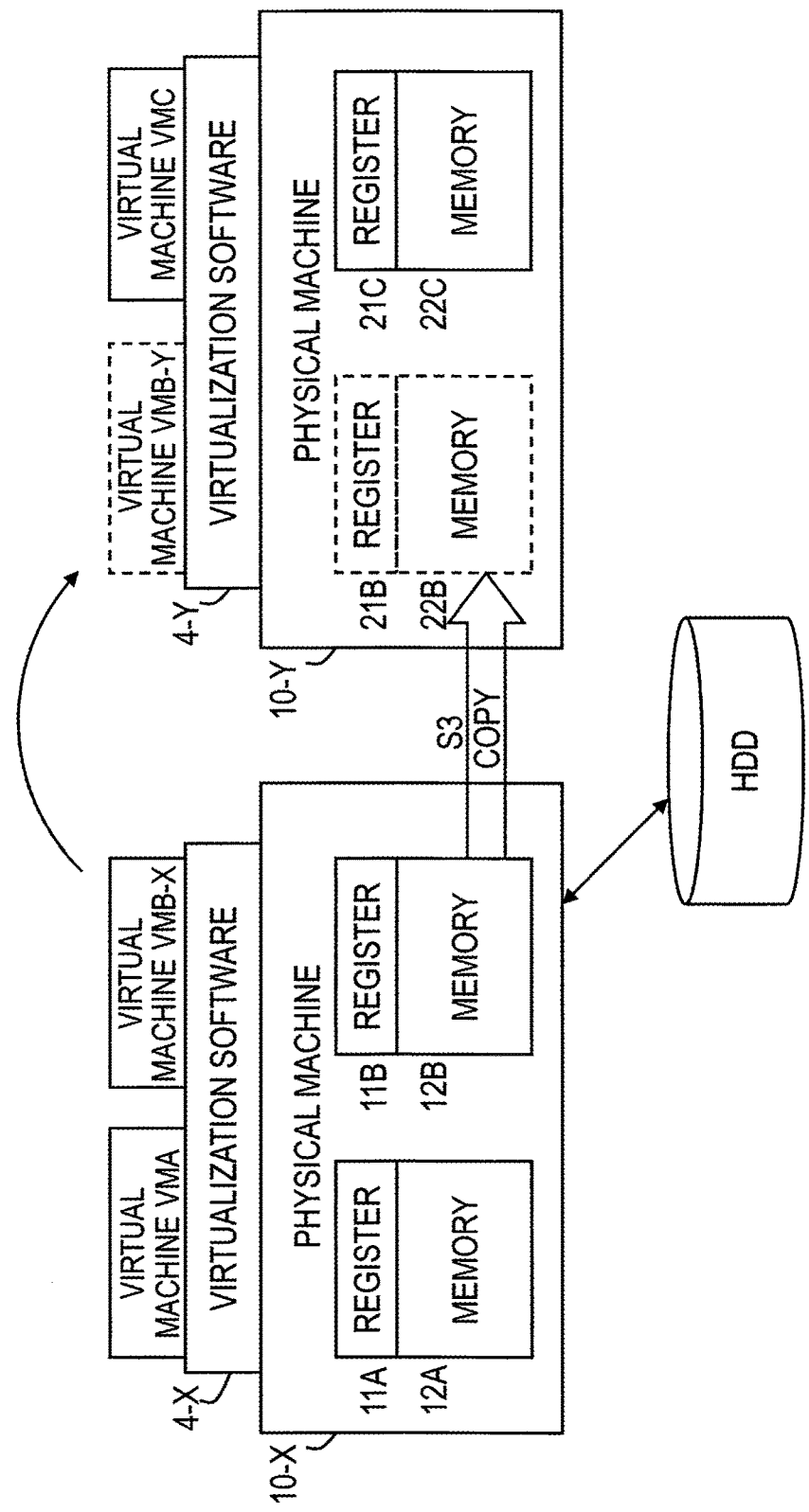

Next, as illustrated in FIG. 7, the virtualization software 4-X transfers and copies the contents (data) stored in the memory 12B of the source virtual machine VMB-X to the memory 22B of the destination virtual machine VMB-Y (S3). This memory content transfer process requires a long processing time. Further, when the running virtual machine VMB-X writes the data into the memory 12B during the memory content transfer process, data of the thus updated page area (difference data) or of a dirty page (difference page) are transferred and copied again from the memory 12B to the memory 22B. This memory content transfer process is continued until the memories 12B, 22B are synchronized with each other. The virtualization software 4-X ends the memory transfer when the volume of the dirty page generated during the memory content transfer becomes small. As a result, contents (data) substantially the same as those of the memory of the running virtual machine VMB-X are written into the memory 22B.

Figure 8:
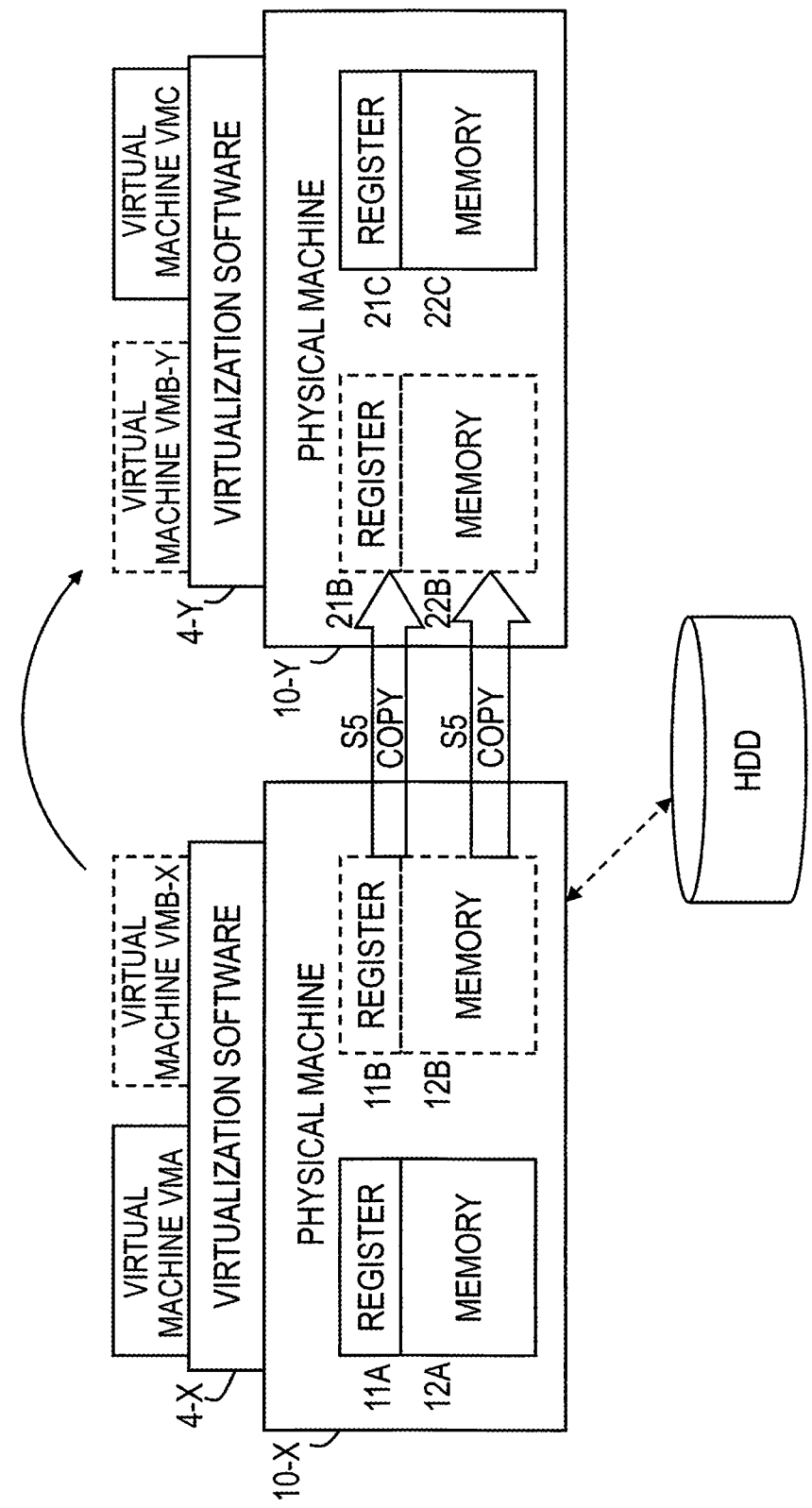

As illustrated in FIG. 8, the virtualization software 4-X suspends the source virtual machine VMB-X (S4). This consequently stops the operation of the source virtual machine VMB-X, which means that further data writing into the memory 12B or data modification in the register 11B of the CPU does not take place.

Suspending a virtual machine means temporarily stopping a virtual machine, and such a process includes a step of stopping allocation of hardware such as a CPU to a virtual machine, a step of saving data or information stored in the memory of the virtual machine onto its hard disk, a step of saving contexts such as a command address sent during the execution of the CPU of the virtual machine and data within various registers (general-purpose register, floating-point register, etc.) onto the hard disk, and a step of opening the hardware resource allocated to the virtual machine.

On the other hand, resuming a virtual machine means restarting a virtual machine that has temporarily been stopped, and such a process includes a step of allocating a hardware resource to the virtual machine, a step of reading the contexts from its hard disk and restoring the contexts in its memory, a step of reading the data or information stored in the memory of the virtual machine from the hard disk and restoring them in the memory, and a step of restarting allocation of hardware such as a CPU to the virtual machine.

After suspending the source virtual machine VMB-X, the virtualization software 4-X transfers the data of the dirty page remaining in the memory 12B of the source virtual machine and the data (contexts) of the register 11B of the CPU to the memory 22B of the destination virtual machine VMB-Y and a register 21B of the CPU (S5), as illustrated in FIG. 8. The amount of data transferred at this stage is very small, and the source virtual machine VMB-X and the destination virtual machine VMB-Y are stopped simultaneously within a short period of time.

Figure 9:
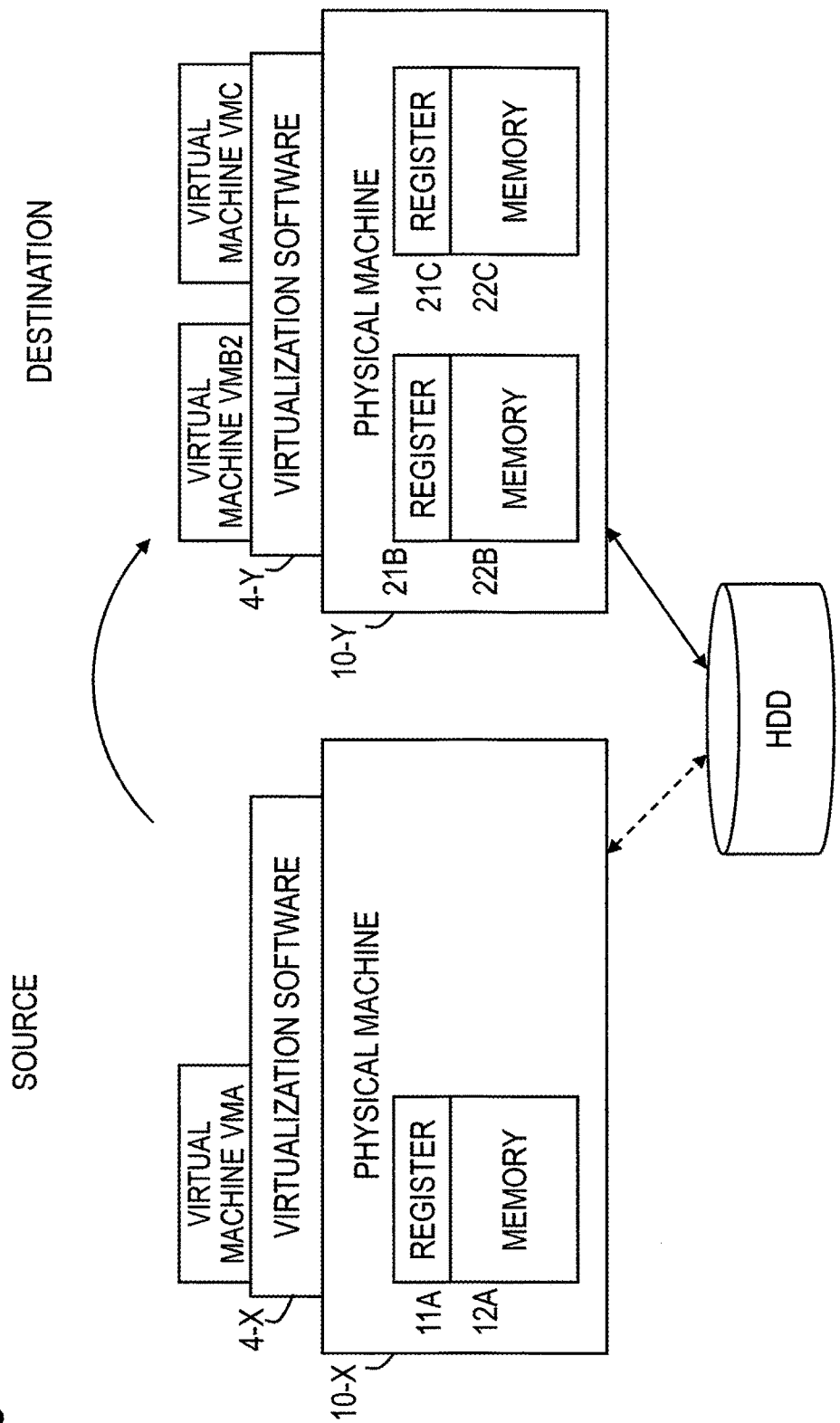

As illustrated in FIG. 9, the virtualization software 4-Y resumes the destination virtual machine VMB-Y (S6). This resuming process is carried out specifically as above. Because the data in the memory 12B and register 11B of the source virtual machine VMB-X are copied to the memory 22B and the register 21B of the CPU of the destination virtual machine VMB-Y, allowing the virtualization software 4-X to resume the destination virtual machine VMB-Y leads to a restart of the operation of the destination virtual machine VMB-Y, the operation being same as that of the source virtual machine VMB-X. The destination virtual machine VMB-Y restarts accessing the hard disk HDD in the same manner as the source virtual machine VMB-X.

Finally, as illustrated in FIG. 9, the virtualization software 4-X deletes the source virtual machine VMB-X (S7). Specifically, the virtualization software 4-X deletes the data stored in the memory 12B and resets the register 11B of the CPU. In this manner, the virtual machine live migration process is completed.

[Memory Content Transfer Process]

Figure 10:
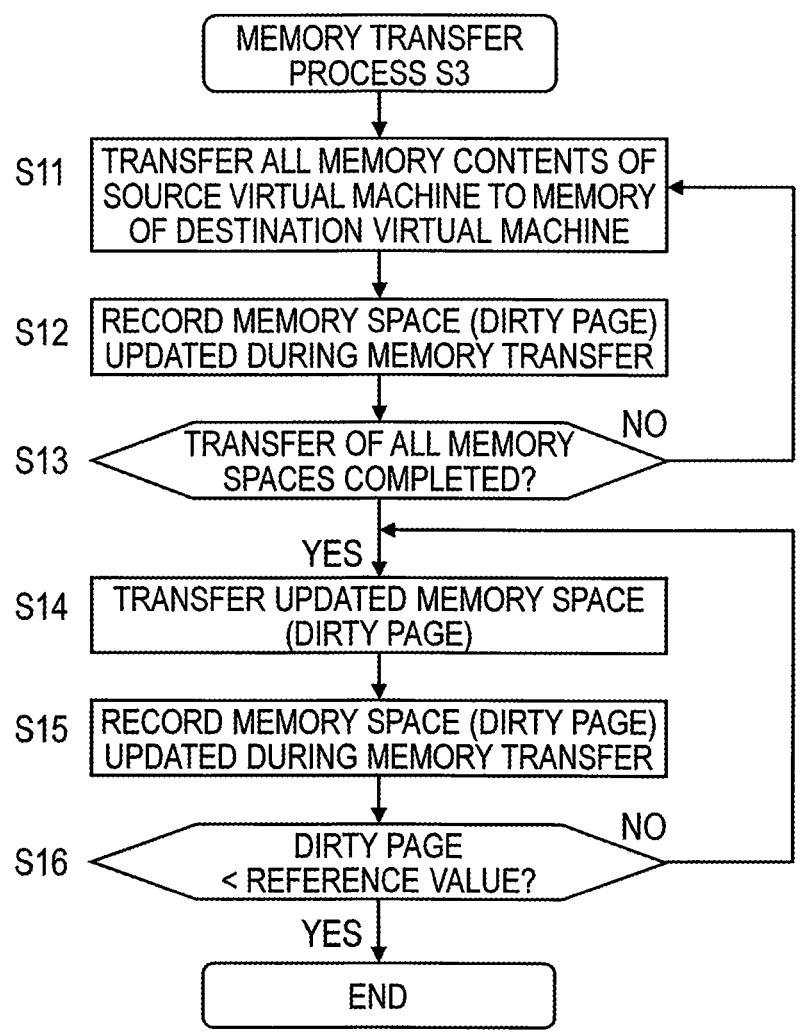
FIG. 10 is a flowchart schematically illustrating the memory content transfer process S3.
Figure 11:
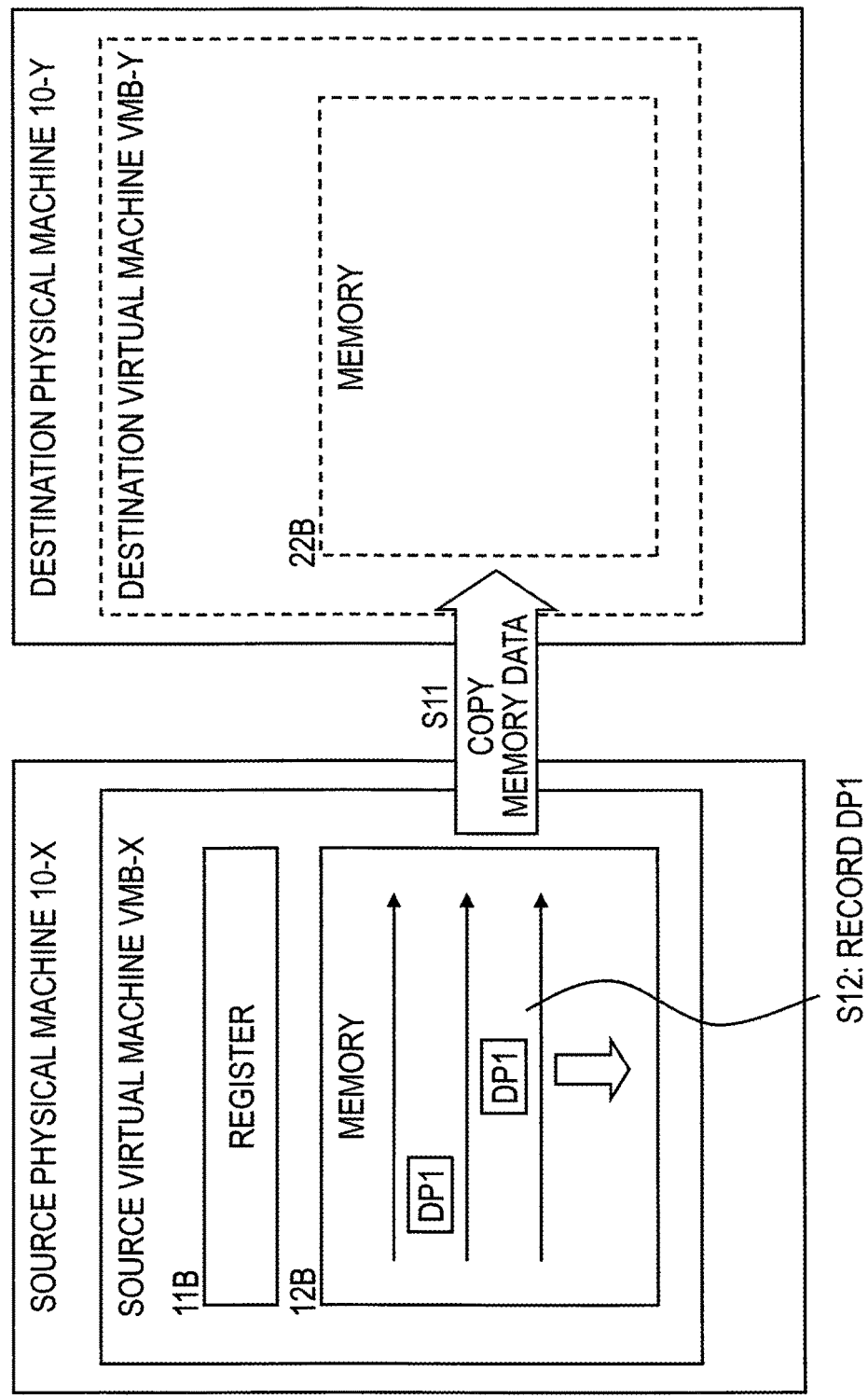
FIGS. 11, 12 and 13 are diagrams for explaining the memory content transfer process.
Figure 12:
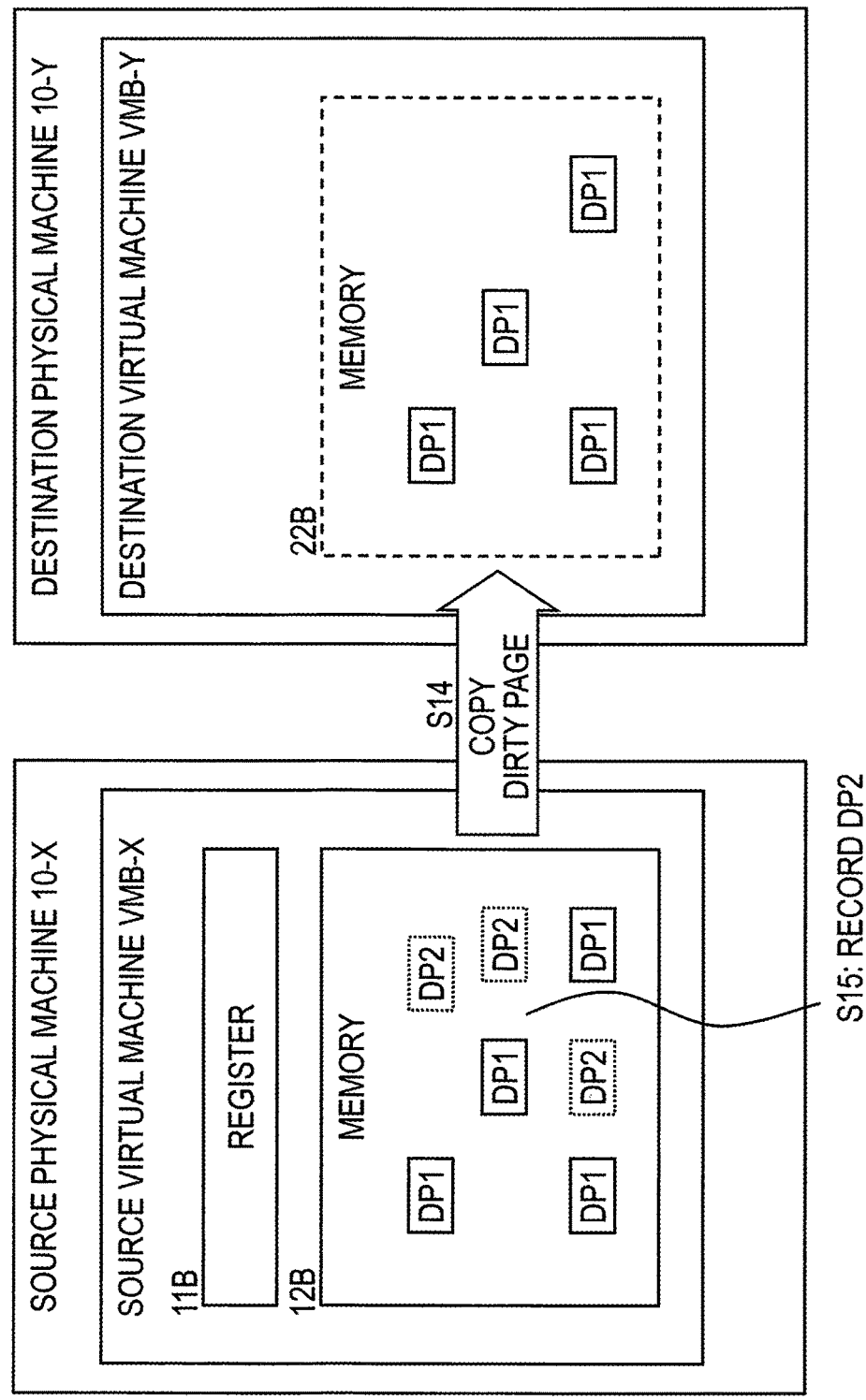
Figure 13:
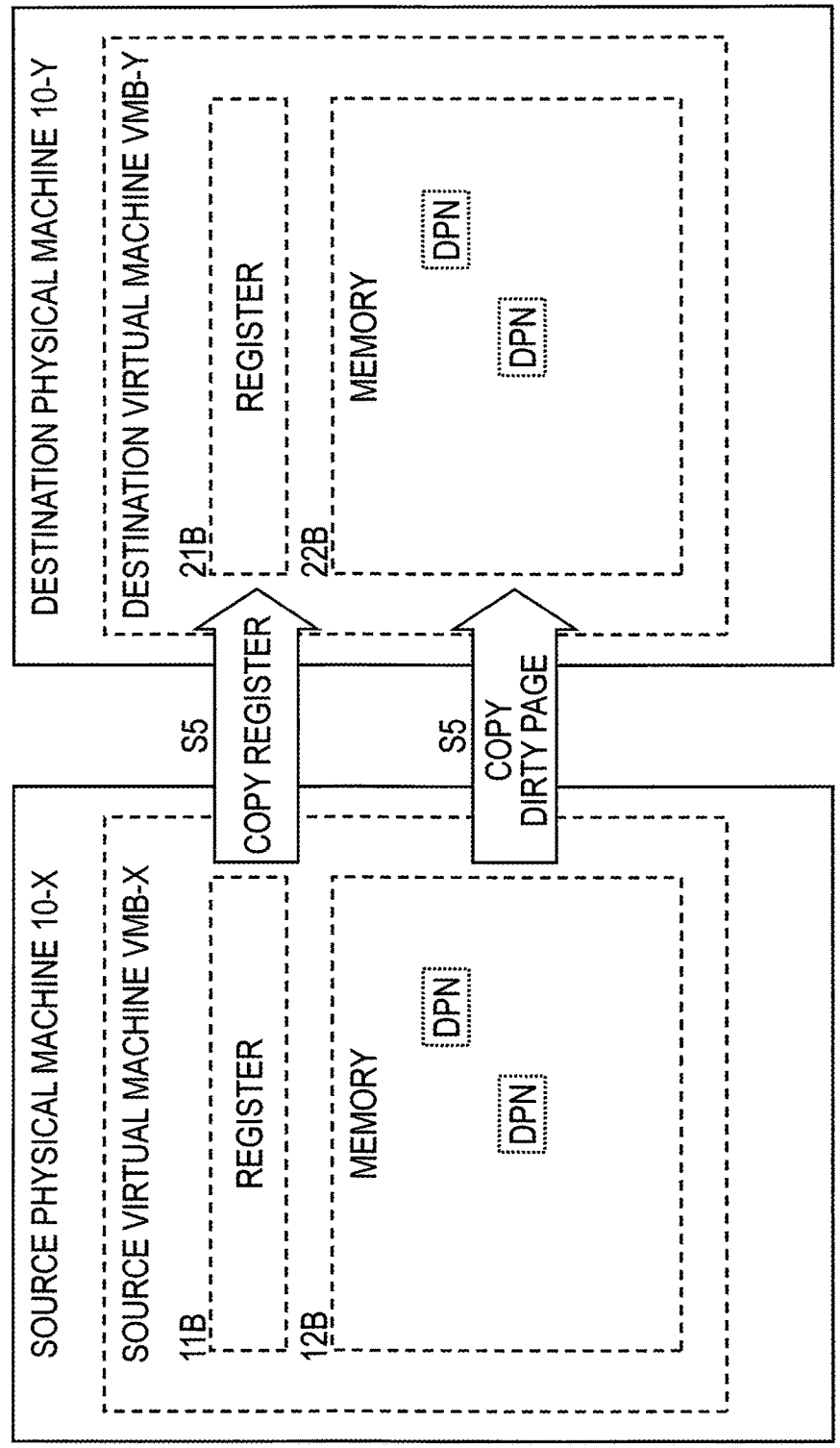

FIG. 10 is a flowchart schematically illustrating the memory content transfer process S3. FIGS. 11, 12 and 13 are diagrams for explaining the memory content transfer process. As illustrated in FIG. 11, the virtualization software 4-X first transfers and copies all memory contents of the memory 12B allocated to the source virtual machine VBM-X of the source physical machine 10-X to the memory 22B to be allocated to the destination virtual machine VMB-Y of the destination physical machine 10-Y (S11). During this memory content transfer, data writing into the memory 12B is performed by the running source virtual machine VMB-X, thereby generating a dirty page DP1, a page area with the updated data. The virtualization software 4-X records this updated memory space (the dirty page DP1) that was updated during the memory transfer (S12).

Upon completion of the transfer of all memory spaces (YES in S13), the virtualization software 4-X transfers and copies again the dirty page DP1 to the destination memory 22B, the dirty page DP1 being generated within the memory 12B during the transfer of all memory contents (S14), as illustrated in FIG. 12. During the transfer of this dirty page DP1, data writing into the memory 12B is performed again by the running source virtual machine VMB-X, generating a dirty page DP2, a page area with the updated data. The virtualization software 4-X records this updated memory space (the dirty page DP2) that was updated during the memory transfer (S15).

The steps S14, S15 are repeated until the volume of dirty pages within the memory 12B becomes less than a reference value (NO in S16). When the volume of dirty pages within the memory 12B becomes less than a reference value (YES in S16), the memory content transfer process ends.

As described with reference to the flowchart illustrated in FIG. 5, the virtualization software 4-X suspends the source virtual machine VMB-X and, as illustrated in FIG. 13, transfers and copies dirty pages DPN remaining in the memory 12B and the data (contexts) stored in the register 11B of the CPU to the memory 22B and the register 21B of the destination virtual machine VMB-Y respectively (S5). Consequently, the destination virtual machine VMB-Y is resumed and the source virtual machine VMB-X is deleted, completing the live migration.

Figure 14:
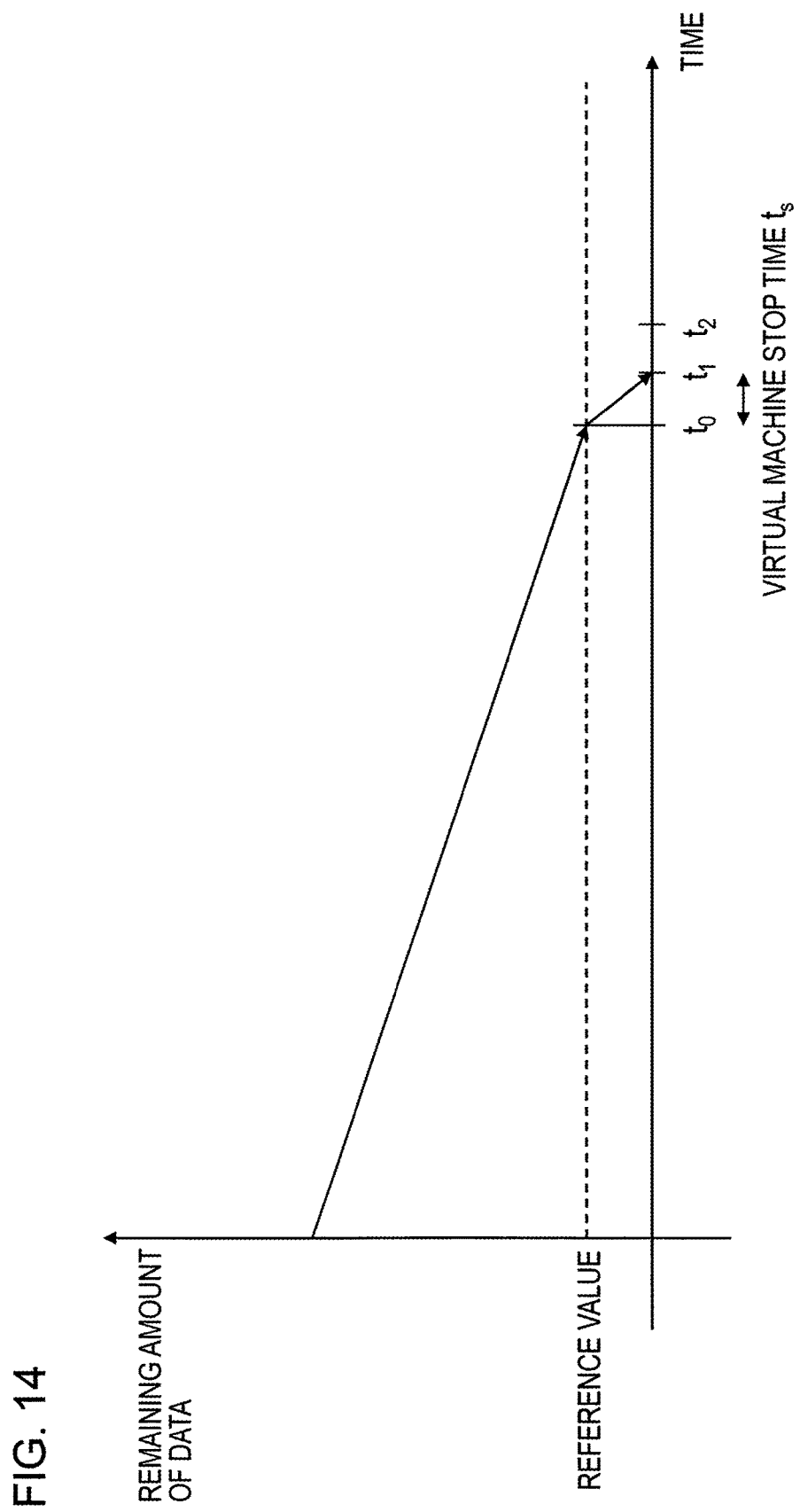
FIG. 14 is a diagram illustrating an example of completing the migration process within an allowed time.

FIG. 14 is a diagram illustrating an example of completing the migration process within an allowed time. The horizontal axis represents a time axis, while the vertical axis represents the remaining amount of data to be transferred from the memory of the migration source physical machine to the memory of the migration destination physical machine. The reference value illustrated in FIG. 14 is used as a guideline for suspending the migration source virtual machine when the remaining amount of data to be transferred drops to this reference value. In addition, time $t_2$ is set as the allowed time in which the migration source virtual machine is suspended (referred to as "allowed time $t_2$," hereinafter).

As illustrated in FIG. 14, the remaining amount of data to be transferred decreases with the lapse of time. In other words, this indicates that the number of transfers of memory contents exceeds the number of dirty pages generated. When the remaining amount of data to be transferred is reduced to the reference value, the migration source virtual machine is suspended (at time $t_0$ illustrated in FIG. 14) and the remaining data are transferred completely (at time $t_1$ illustrated in FIG. 14). In other words, the migration source virtual machine is stopped at least until the remaining data are completely transferred after the migration source virtual machine is suspended (during a stop time $t_S$ illustrated in FIG. 14).

Figure 15:
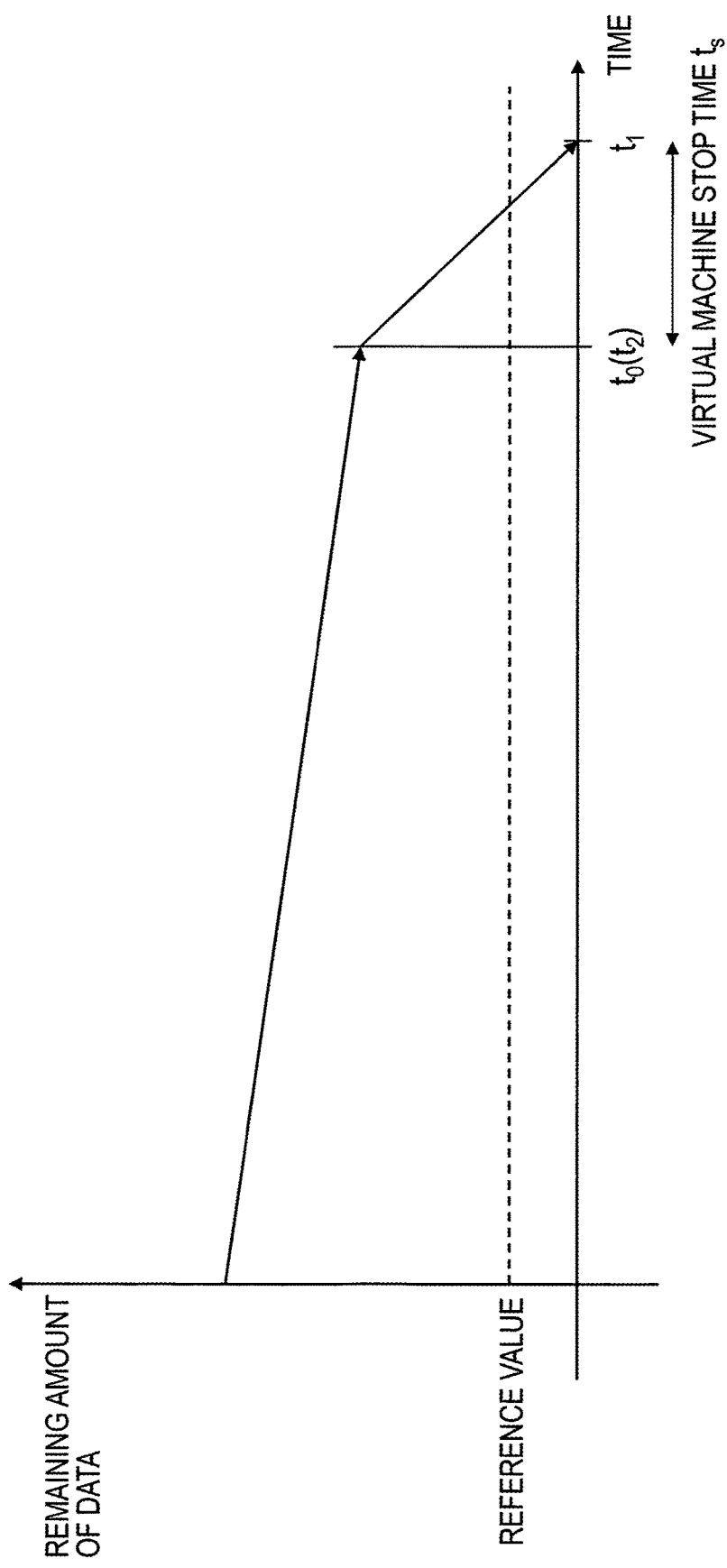
FIG. 15 is a diagram illustrating an example in which the migration process is not completed within the allowed time.

Unlike the example illustrated in FIG. 14, FIG. 15 is a diagram illustrating an example in which the migration process is not completed within the allowed time. As illustrated in FIG. 15, the rate at which the remaining amount of data to be transferred decreases with the lapse of time is lower than that illustrated in the example in FIG. 14. In other words, although in FIG. 15 the number of transfers of memory contents exceeds the number of dirty pages generated, the difference therebetween is smaller in FIG. 15 than that illustrated in the example in FIG. 14.

As illustrated in FIG. 15, the migration source virtual machine is suspended although the remaining amount of data to be transferred has not yet dropped to the reference value at the allowable time $t_2$. For this reason, the amount of data to be transferred has increased at the time for stopping the migration source virtual machine, and the stop time $t_S$ during which the migration source virtual machine is stopped is longer than that illustrated in the example in FIG. 14.

[Memory Transfer in Migration According to the Present Embodiment]

As described with reference to FIGS. 10, 14 and 15, when, in the migration process, data update frequently takes place in the memory of the migration source virtual machine during transfer of memory contents, the volume of dirty pages generated increases. This phenomenon is unfavorable as it leads to an increase in the amount of time it takes to execute the memory content transfer process before the remaining amount of data to be transferred reaches the reference value, or incompletion of the memory content transfer process.

The present embodiment, therefore, restricts writing to the memory contents of the migration source virtual machine when the scheduled time for completion of memory content transfer for the migration source virtual machine is expected to exceed a permissible value, and thereby delays the ending time of the transfer process.

First Embodiment

Figure 16:
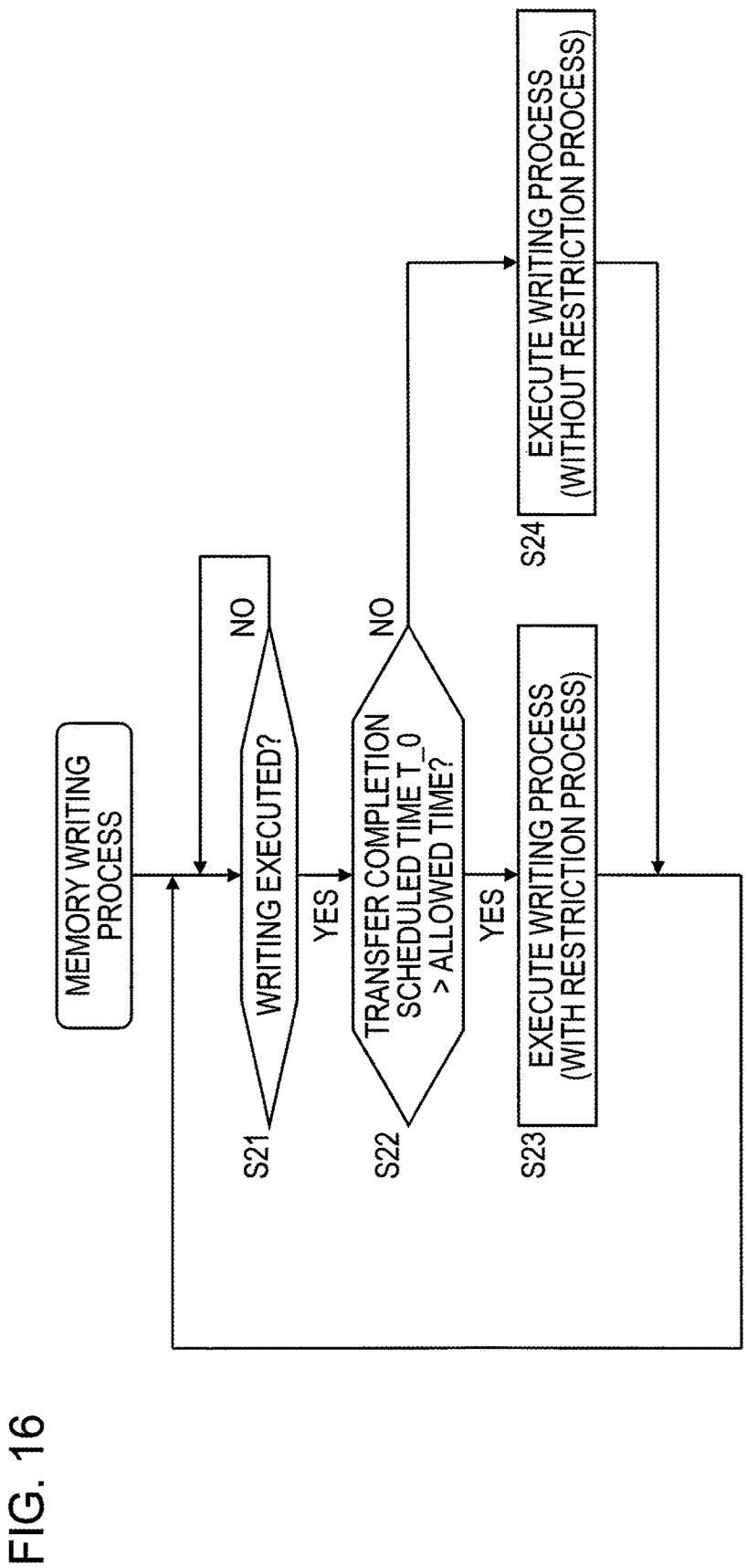
FIG. 16 is a flowchart for schematically explaining the memory writing process.

A first embodiment is now described. FIG. 16 is a flowchart for schematically explaining the memory writing process. When a write request for writing data to the memory space of a virtual machine is generated (S21), the virtualization software 4 compares the transfer completion scheduled time T_0 with an allowed time (S22). This transfer completion scheduled time T_0 is obtained based on the number of transfer memory spaces where transfer takes place within a certain unit time and the number of dirty pages generated in this unit time, by predicting the time it takes to transfer the data of the memory of the migration source virtual machine to the memory of the migration destination physical machine. Also, the allowed time is the maximum allowed time of the transfer completion scheduled time T_0 that is defined in advance in view of, for example, the service requirements.

This transfer completion scheduled time T_0 can be calculated by dividing the amount of data to be transferred from the memory of the migration source virtual machine to the memory of the migration destination physical machine by a data transfer rate. A specific method for calculating the transfer completion scheduled time T_0 is described hereinafter.

The amount of data to be transferred is now described. In the migration process, after the data in the memory of the migration source virtual machine is transferred as illustrated in FIG. 7, the migration source virtual machine is suspended, and the data of the dirty pages remaining in the memory of the migration source virtual machine and the data (contexts) of the register of the CPU are transferred (the sum of the data of the dirty pages and the contexts is referred to as "final transfer data") as illustrated in FIG. 8. Thus, the amount of data to be transferred can be calculated by subtracting the amount of final transfer data from the total amount of data in the memory of the migration source virtual machine. In other words, the amount of data to be transferred can be calculated by the following formula (1). Note that the amount of final transfer data corresponds to the reference values illustrated in FIGS. 13 and 14.

$$\text{Amount of data to be transferred} = \text{Total amount of data in the memory of the migration source virtual machine} - \text{Amount of final transfer data} \quad (1)$$

The data transfer rate is now described. A dirty page is generated when writing takes place in a memory space in process of transfer or an already transferred memory space, while the memory contents of the migration source virtual machine are being transferred. When a dirty page is generated, this generated dirty page needs to be re-transferred from the migration source virtual machine to the migration destination physical machine. Therefore, by subtracting the number of dirty pages newly generated in a certain unit time from the number of transfer memory spaces transferred from the migration source virtual machine to the migration destination physical machine in the certain unit time, the number of effective transfer memory spaces for the certain unit time is obtained. The number of effective transfer memory spaces indicates the level of decrease per unit time in the number of remaining memory spaces to be transferred. Therefore, the data transfer rate (the amount of data transferred in each unit time) can be calculated by multiplying the amount of data per memory space by the number of effective transfer memory spaces for each unit time. In other words, the data transfer rate can be calculated by the following formula (2).

$$\text{Data transfer rate} = (\text{Number of transfer memory spaces transferred in certain unit time} - \text{Number of dirty pages newly generated in the certain unit time}) * \text{Amount of data per memory space} \quad (2)$$

Moreover, this data transfer rate may be obtained by subtracting the number of dirty pages newly generated within a certain measurement time from the number of transfer memory spaces transferred from the migration source virtual machine to the migration destination physical machine within the measurement time to obtain the number of effective transfer memory spaces present in this measurement time, multiplying the amount of data per memory space by the number of effective transfer memory spaces present in the measurement time, and then dividing the resultant value by the measurement time. Specifically, the data transfer rate can be calculated by the following formula (3).

$$\text{Data transfer rate} = (\text{Number of transfer memory spaces transferred in a certain measurement time} - \text{Number of dirty pages newly generated within the measurement time}) * \text{Amount of data per memory space}/\text{Measurement time} \quad (3)$$

Then, the transfer completion scheduled time T_0 can be calculated by dividing the amount of data to be transferred, which is obtained by the formula (1), by the data transfer rate obtained by the formula (2) or (3). Specifically, the transfer completion scheduled time T_0 can be calculated by the following formula (4).

$$\text{Transfer completion scheduled time T\_0} = \text{Amount of data to be transferred}/\text{Data transfer rate} \quad (4)$$

In the course of calculating the transfer completion scheduled time T_0, when the number of effective transfer memory spaces for each unit time is greater than 0, the transfer completion scheduled time T_0 is at least a positive finite value. However, if there is a restriction due to the service requirements or the like, the transfer completion scheduled time T_0 needs to be equal to or lower than a predetermined allowed time. Therefore, in such a case, whether to execute a write restriction process described below or not needs to be determined by comparing the transfer completion scheduled time T_0 with the allowed time instead of determining whether the calculated transfer completion scheduled time T_0 is a positive finite value or not.

[Write Restriction Process]

Returning to FIG. 16, when the transfer completion scheduled time T_0 is below the allowed time (NO in S22), a normal writing process where the write restriction process is not executed is performed on a write destination memory space for which a write request is made (S24). When, on the other hand, the transfer completion scheduled time T_0 exceeds the allowed time (YES in S22), the write restriction process is executed, and then a writing process is performed (S23).

This write restriction process is for restricting a writing process to delay it until the following unit time (e.g., the next unit time) in a case where, for example, the number of dirty pages generated within a current unit time exceeds a predetermined threshold. The end of a writing process is delayed by this write restriction process. The write restriction process may be a process for delaying the end of a writing process by making the time for the writing process longer than normal.

In this manner, the information processing system of the first embodiment restricts writing onto the memory contents of the migration source virtual machine when the transfer completion scheduled time T_0 exceeds the allowed time. As a result, the information processing system of the first embodiment can be done in such a manner that the number of effective transfer memory spaces increases and the transfer completion scheduled time T_0 decreases. The information processing system of the first embodiment, therefore, can shorten the time for transferring memory contents and end the transfer of memory contents within the allowed time under a situation where a communication bandwidth for executing the migration is restricted.

Second Embodiment

Figure 17:
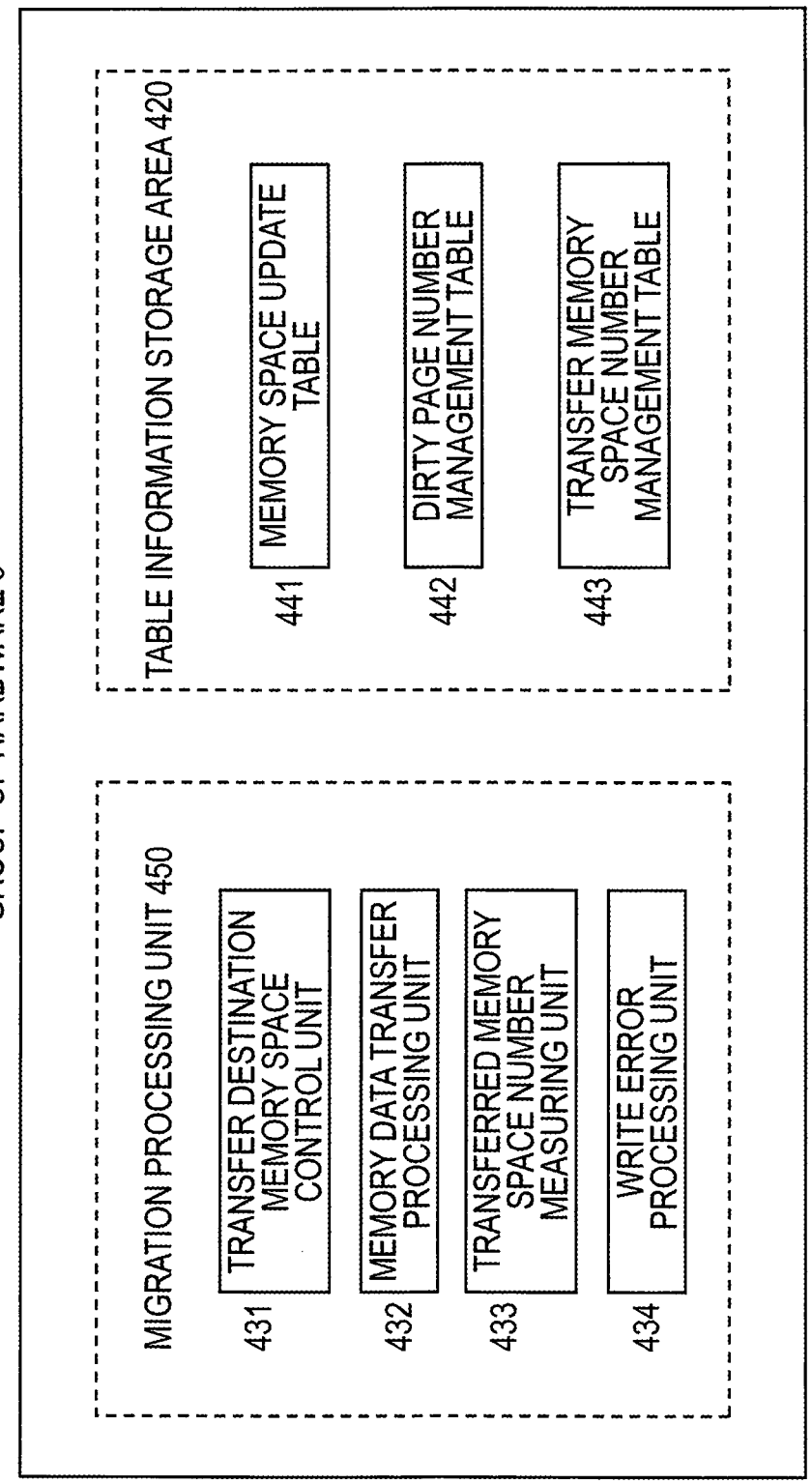
FIG. 17 is a diagram for explaining the migration processing unit.

A second embodiment is now described. FIG. 17 is a diagram for explaining the migration processing unit. As described with reference to FIG. 2, the migration processing program 417 is executed by the CPU of the group of hardware 5, thereby operating as a migration processing unit 450. The migration processing unit 450 transfers the data stored in the memory of the migration source virtual machine to the memory of another physical machine (migration destination physical machine) in response to a migration instruction from the management server 3.

Through execution of the migration processing program 417 by the CPU of the group of hardware 5, the migration processing unit 450 realizes the functions of a transfer destination memory space control unit 431 for securing a new memory space in the migration destination physical machine, a memory data transfer processing unit 432 for transferring the memory contents of the migration source virtual machine from the migration source physical machine to the migration destination physical machine, a transferred memory space number measuring unit 433 for measuring the number of memory spaces transferred in each unit time when transferring the data of the memory of the migration source physical machine to the memory of the migration destination physical machine, and a write error processing unit 434 for executing an error process when a write request is made for an unwritable memory space (a write-prohibited memory space). The details of the error process are described with reference to FIG. 21.

In the table information storage area 420 described with reference to FIG. 2 are stored information on a memory space update table 441 for storing information indicating whether each memory space in the memory of the migration source virtual machine is a dirty page or not, a dirty page number management table 442 for adding up dirty pages generated in each unit time and storing the number of these dirty pages, and a transfer memory space number management table 443 for storing the number of transferred memory spaces for each unit time that is measured by the transferred memory space number measuring unit 433. Note that the unit time described in the dirty page number management table 442 is constantly synchronized with the unit time described in the write transfer memory space number management table 443.

[Memory Transfer Process]

Figure 18:
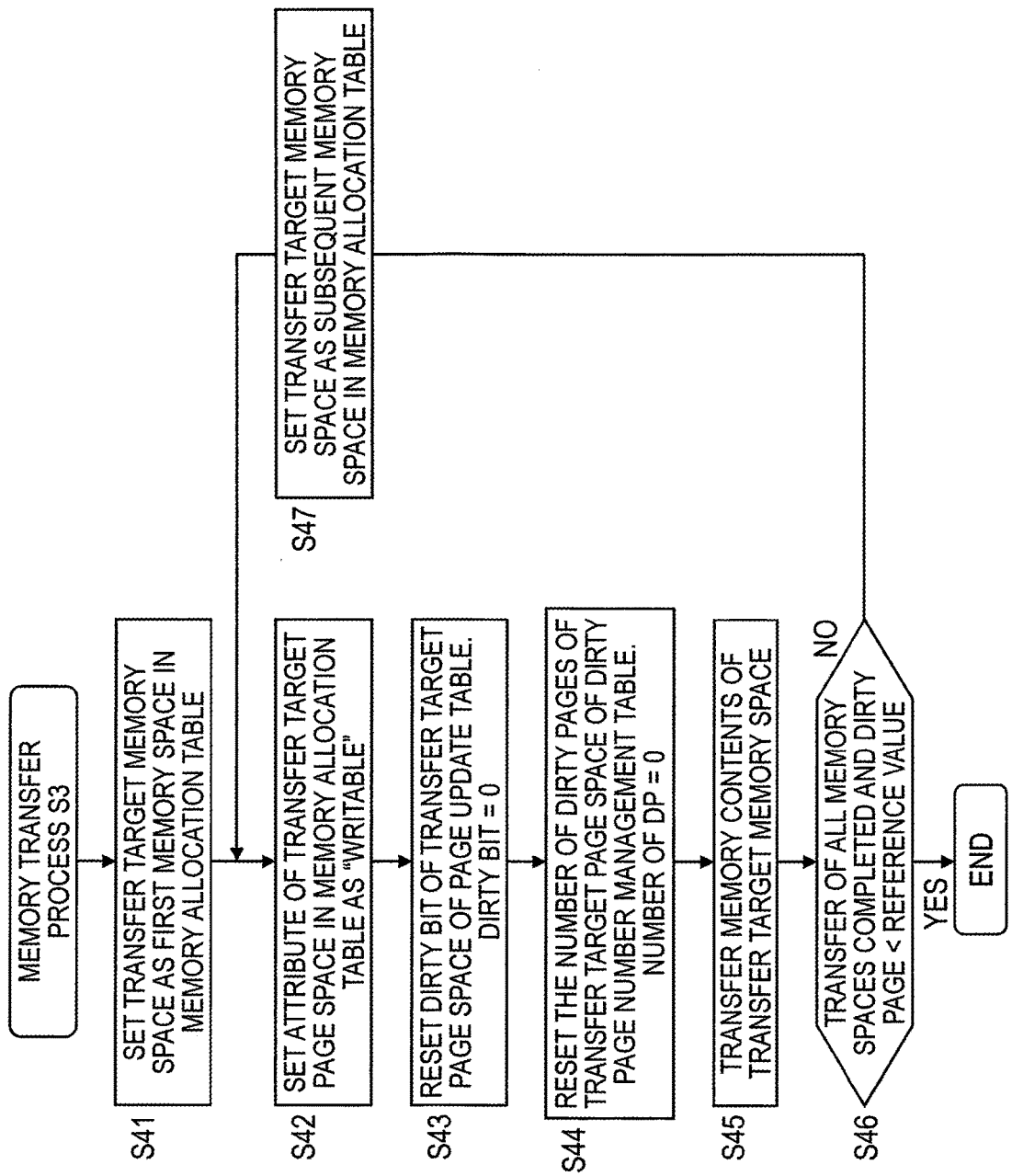
FIG. 18 is a flowchart for explaining the memory content transfer process S3.

FIG. 18 is a flowchart for explaining the memory content transfer process S3. The memory content transfer process S3 is where the virtualization software 4 transfers and copies the data of the memory of the migration source virtual machine to the memory of the migration destination physical machine, thereby sequentially transferring the memory spaces. A memory space that is actually transferred in the transfer process S3 is referred to as "transfer target memory space" hereinafter. This memory space is a unit area to be transferred and can be changed depending on the condition or the like of the communication line.

The virtualization software 4 first makes the transfer target memory space a first memory space in the memory allocation table 421 (S41). Specifically, at the start of the memory content transfer process S3, the top memory space stored in the memory allocation table 421 is set as the transfer target memory space. It is not necessary to transfer the memory spaces in the order in which the memory spaces are stored in the memory allocation table 421, but may be transferred in any order depending on the transfer condition and the like.

Next, the virtualization software 4 configure the settings for the memory allocation table 421, the memory space update table 441, and the dirty page number management table 442 that are referenced in the memory content transfer process S3 (S42 to S44). The configurations of the memory allocation table 421, memory space update table 441 and dirty page number management table 442 are described hereinafter.

FIG. 19 is a diagram illustrating an example of the memory allocation table. The memory allocation table 421 has a virtual address of each of the memory spaces of the migration source virtual machine, a physical address (or allocated memory address) associated one-on-one with the virtual address, and an attribute indicating whether each memory space is writable or not. The memory allocation table 421, therefore, is for storing the relationship between the virtual address and physical address of each memory space and the attribute of each memory space. In the example illustrated in FIG. 19, the memory allocation table 421 stores information on four memory spaces having virtual addresses V-ADD-0, V-ADD-1, V-ADD-2, and V-ADD-3, as well as the relationships between virtual address V-ADD-0 and physical address P-ADD-a, virtual address V-ADD-1 and physical address P-ADD-b, virtual address V-ADD-2 and physical address P-ADD-c, and virtual address V-ADD-3 and physical address P-ADD-d. In regard to the attributes in this example, "0" indicating unwritability is set for all of the four memory paces. If writable, "1" is set as the attributes.

FIG. 20 is a diagram illustrating examples of the memory space update table and dirty page number management table. The memory space update table 441 stores information indicating whether each of the memory spaces in the memory of a virtual machine is a dirty page or not, and has a virtual address corresponding to each of the memory spaces of the memory of the virtual machine, and a dirty bit for storing information indicating whether each of the memory spaces is a dirty page or not. The dirty page number management table 442 adds up dirty pages that are generated per unit time, and has a unit time, which is a total time, and the number of dirty pages added up per unit time. The term "DP" in the following description stands for dirty page.

The memory space update table 441 in the example illustrated in FIG. 20 stores the dirty bits associated with the virtual addresses V-ADD-0, V-ADD-1, V-ADD-2, and V-ADD-3, respectively. The dirty bits in this example are set at "0" for all of the four memory spaces, which means that these memory spaces are not dirty pages. In a case where these memory spaces are dirty pages, "1" is stored as the dirty bits. According to the dirty page number management table in the example illustrated in FIG. 20, writing is performed on "10" memory spaces in a unit time $t_0$, "14" memory spaces in a unit time $t_1$, and "11" memory spaces in a unit time $t_2$.

Note that the number of memory spaces per unit time is obtained by adding up the memory spaces on which writing takes place. Thus, even in a case where writing is performed multiple times on a certain memory space within a certain unit of time, the number of write memory spaces is counted as "1." Furthermore, while the memory contents are transferred, the dirty page number management table 442 continues to add up the write memory spaces every unit time.

Returning to FIG. 18, the virtualization software 4 sets the attribute of the transfer target memory space of the memory allocation table 421 as "unwritable" (S42). As a result, a write error is generated when a write request is made for a memory space in process of transfer or for an already transferred memory space, and then the error process is executed as will be described with reference to FIG. 22. The virtualization software 4 also sets the dirty bit of the transfer target memory space of the memory space update table 441 at "0" (S43), and sets the number of dirty pages of the transfer target memory space of the dirty page number management table 442 at "0" (S44). Therefore, in a case where a write request is made for the memory space in process of transfer or for the already transferred memory space, the information (virtual address) of this memory space for which the write request is made can be stored.

Subsequently, the virtualization software 4 transfers the memory contents of the transfer target memory space (S45). Upon completion of the transfer of the memory contents of the transfer target memory space, when transfer of all of the memory spaces is completed and the number of untransferred dirty pages is below the reference value, the memory transfer process S3 is ended (YES in S46). Because dirty pages are continuously generated before the migration source virtual machine is suspended, it is difficult to predict the time at which the transfer of the dirty pages is completely ended, or it might take a long time for the transfer to completely end. For this reason, the migration source virtual machine is suspended as soon as the number of dirty pages in the memory of the migration source virtual machine falls below the reference value, so that the processing time required for the entire migration can be predicted easily or so that the migration does not require a long period of time. Note that this reference value is determined based on, for example, the allowed time for virtual machine stop scheduled time.

Moreover, the memory transfer process S3 illustrated in FIG. 18 assumes that the dirty pages are transferred after completion of the transfer of all of the memory spaces; however, the transfer of the dirty pages may be started prior to the completion of the transfer of all of the memory spaces.

On the other hand, when the condition that the transfer of all of the memory spaces is completed and the number of untransferred dirty pages falls below the reference value is not satisfied after transferring the memory contents of the transfer target memory space (NO in S46), the transfer target memory space is set to the next memory in the allocation table (S47). Then, the process from S42 to S47 is repeated until the transfer of all of the memory spaces is completed and the number of untransferred dirty pages falls below the reference value. Note that the memory contents of the transfer target memory space may be transferred in parallel as long as the tables can be updated or managed in any way.

[Memory Writing Process]

Figure 21:
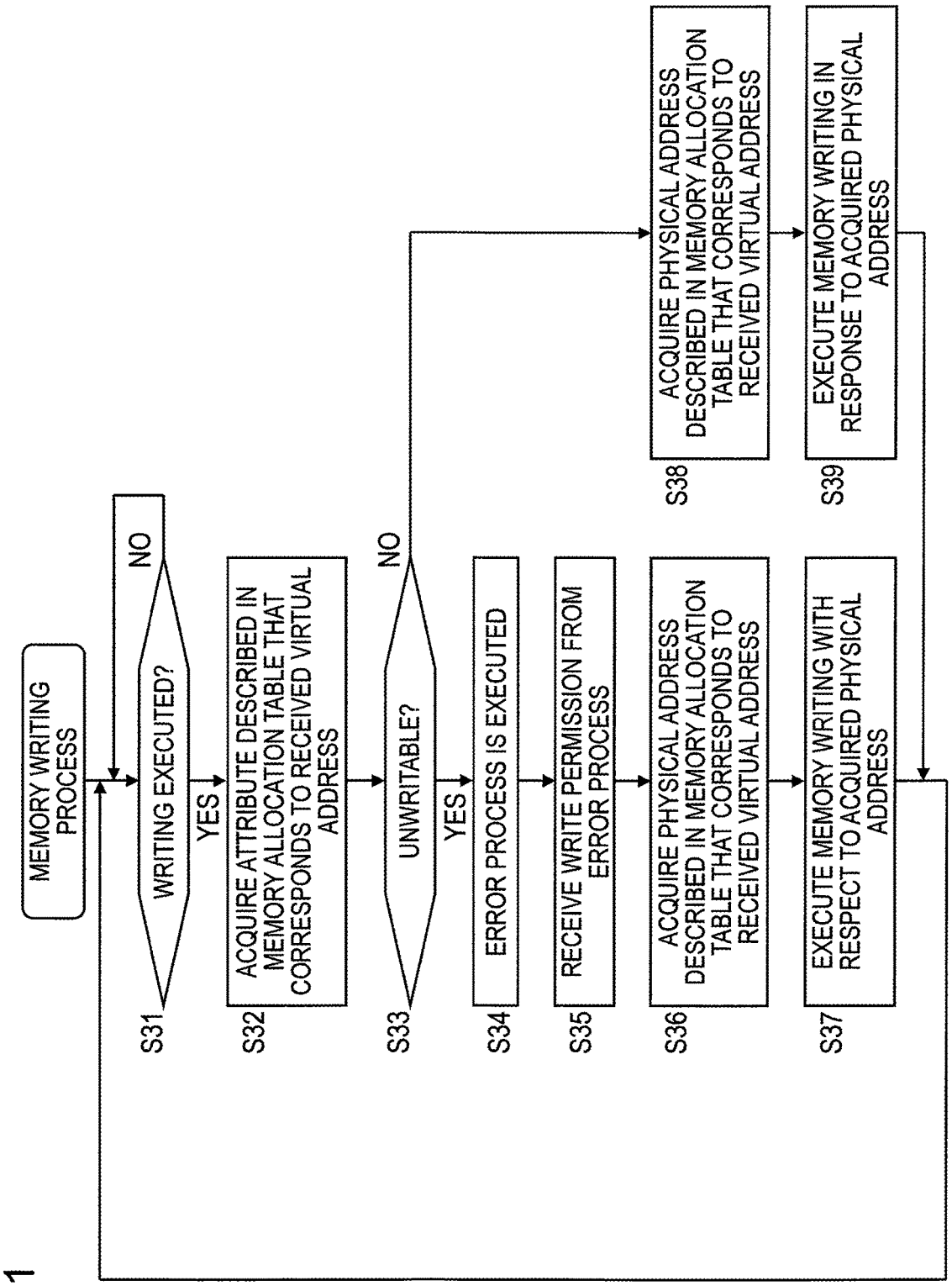
FIG. 21 is a flowchart for explaining the details of the memory writing process.

FIG. 21 is a flowchart for explaining the details of the memory writing process. The memory writing process takes place during the memory transfer process illustrated in FIG. 18 and when a write request is issued from a write migration source virtual machine. The virtual machine write processing program 418 described with reference to FIG. 2 is executed by the CPU of the group of hardware 5, thereby operating as a virtual machine write processing unit. First, the virtual machine write processing unit receives from the migration source virtual machine a request for writing to a memory space of the memory thereof (S31). The source virtual machine does not recognize the physical address but the virtual address of its memory. The source virtual machine, therefore, issues a memory write request based on the virtual address. It should be noted that the writing process is not executed until the virtual machine write processing unit receives the write request.

After receiving the write request, the virtual machine write processing unit refers to the memory allocation table 421 to acquire the attribute of the virtual address for which the write request was made (S32). Since the memory allocation table 421 was already described in detail with reference to FIG. 19, the description thereof is omitted.

In a case where the attribute acquired in S32 indicates "writable" (NO in S33), the virtual machine write processing unit acquires the physical address corresponding to the virtual address from the memory allocation table 421 (S38), and sends the acquired physical address to the migration source virtual machine (S39). When the attribute acquired in S32 indicates "writable," then it means that the attribute is not set as "unwritable" in the memory transfer process S3 illustrated in FIG. 18 (S42) and therefore that the transfer of the memory space is not yet executed. Note that writing to the memory space based on the physical address may be executed by the write migration source virtual machine that acquires the physical address or by the virtual machine write processing unit.

However, in a case where the attribute acquired in S32 is set as "unwritable" (YES in S33), the virtual machine write processing unit executes an error process (S34). This error process is executed in response to the error that is output as a result of writing to the unwritable memory space. In other words, when the attribute acquired in S32 is set as "unwritable," then it means that the attribute is set as "unwritable" in the memory transfer process S3 and therefore that the memory space is still being transferred or already transferred. Specifically, this error process updates the attributes described in the memory allocation table 421, the dirty bits described in the memory space update table 441, and the number of dirty pages described in the dirty page number management table 442, and then sends write permission to the memory writing process. The details of this error process are described with reference to FIG. 22.

After receiving the write permission from the error process (S35), the virtual machine write processing unit refers to the memory allocation table 421 to acquire the physical address corresponding to the virtual address associated with the write request (S36), and executes memory writing with respect to the acquired physical address (S37). Subsequently to the process of S37 or S39, the memory writing process waits until the next write request is generated.

[Error Process 1]

Figure 22:
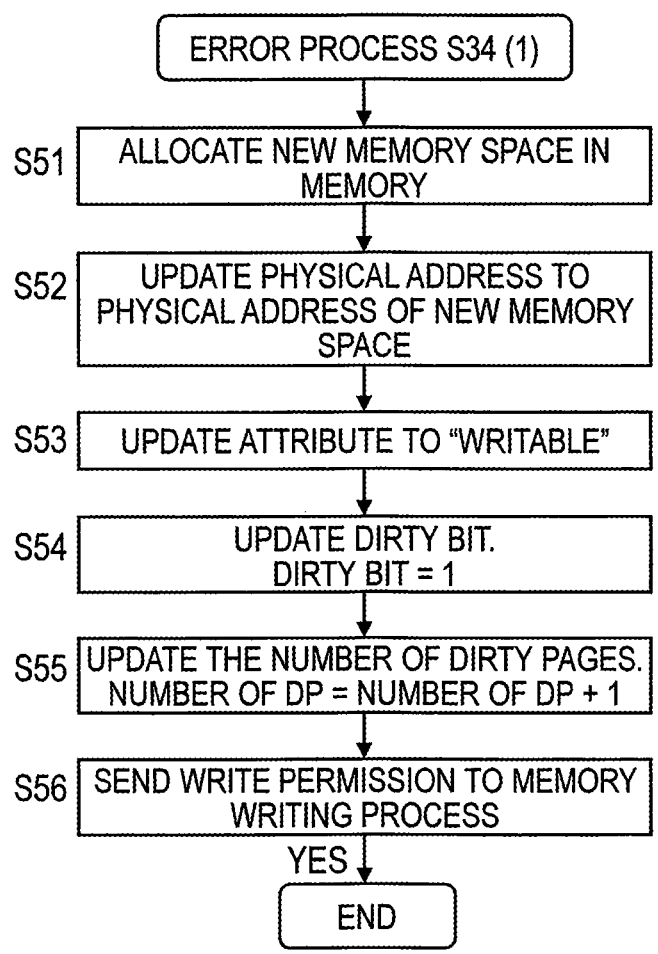
FIG. 22 is a flowchart for explaining the first error process S34.

FIG. 22 is a flowchart for explaining the first error process S34. First, the migration processing unit 450 allocates a new memory space from an unallocated memory of the migration source virtual machine in place of the memory space for which the write request was made (S51). In other words, when there is a write request for the unwritable memory space (the memory space in process of transfer or the already transferred memory space), the error process S34 allocates and secures a new memory space without executing writing to the foregoing memory space. Next, in response to the allocation of the new memory space, the error process 34 updates the physical address of the memory allocation table 421 to the physical address of the new memory space (S52) and updates the attribute to "writable" (S53). In other words, allocating the new memory space can simplify the transfer process because only the newly allocated memory space needs to be transferred when transferring a dirty page.

Since the attribute in the memory allocation table 421 is updated to "writable," in a case where further writing occurs on this allocated new memory space, the result of S33 in the memory writing process is NO, whereby the writing is executed in place of the error process. Therefore, after the allocation of the new memory space, even when another write request is generated for this new memory space, the virtualization software 4 does not allocate a new memory space. In other words, allocation of a new memory space is executed with respect to only the first writing on each of the memory spaces in process of transfer or each of the already transferred memory spaces (the memory spaces whose attributes described in memory allocation table 421 are set as "unwritable"), and then the memory write restriction process described hereinafter is executed. This can prevent frequent allocation of new memory spaces, saving the resources such as the memories.

Next, the migration processing unit 450 updates the dirty bits of the memory space update table 441 to "1" (S54). As a result, when transferring dirty pages, the dirty pages can be transferred by transferring only the memory spaces whose dirty bits are set at "1," by reference only to the memory space update table 441. The migration processing unit 450 also adds "1" to the number of dirty pages described in the dirty page number management table 442 (S55). Consequently, the new memory spaces that are generated in units of time can be added up. Note that the steps S52 to S55 are executed in random order. Subsequently to the process from S52 to S55, the migration processing unit 450 further sends write permission to the memory writing process (S56), and writing is executed in the memory writing process.

[Specific Example of Updating Tables]

FIGS. 23 to 28 are diagrams each illustrating an example of the memory allocation table, the memory space update table, and the dirty page number management table.

A specific example of the process from S52 to S55 of the error process S34 illustrated in FIG. 22 is described with reference to FIGS. 23 to 28. A case in which an error occurs during the process of transferring the four memory spaces of V-ADD-0, V-ADD-1, V-ADD-2 and V-ADD-3 is considered. Specifically, an example of transferring V-ADD-0 (no writing performed during the transfer), V-ADD-1 (writing on V-ADD-1 performed during the transfer), V-ADD-2 (no writing performed during the transfer), and V-ADD-3 (writing performed on V-ADD-0 during the transfer) is described. In this example, suppose that all transfer and writing is executed within the same unit time $t_0$.

At the start of the transfer, the attributes of all of the virtual addresses are set at "1" indicating writability. This is evident from the fact that writing can be executed on all of the memory spaces prior to the start of the transfer. Next, at the start of the transfer of V-ADD-0, the attribute of V-ADD-0 is set at "0" indicating unwritability, as illustrated in FIG. 23. In other words, writing for V-ADD-0 is disabled, and writing for V-ADD-1, V-ADD2 and V-ADD-3 is enabled. Since writing does not occur here, no changes are made in the memory space update table 441 and the dirty page number management table 442.

After the end of the transfer of V-ADD-0 and at the start of the transfer of V-ADD-1, the attribute of V-ADD-1 is set at "0," as illustrated in FIG. 24. In other words, writing for V-ADD-0 and V-ADD-1 is disabled, and writing for V-ADD-2 and V-ADD-3 is enabled. When writing takes place on V-ADD-1 during the transfer of V-ADD-1, the physical address of V-ADD-1 is updated from P-ADD-b to a new memory space (P-ADD-F, in this example), and the attribute of the same is set at "1," as illustrated in FIG. 25. In response to this writing, the dirty bit of V-ADD-1 described in the memory space update table 441 is set at "1," and the number of dirty pages at t0 described in the dirty page number management table 442 is set at "1."

After the end of the transfer of V-ADD-1 and at the start of the transfer of V-ADD-2, the attribute of V-ADD-2 is set at "0," as illustrated in FIG. 26. In other words, writing for V-ADD-0 is disabled, and writing for V-ADD-1, V-ADD-2 and V-ADD-3 is enabled. Since writing is not carried out here, no changes are made in the memory space update table 441 and the dirty page number management table 442.

After the end of the transfer of V-ADD-2 and at the start of the transfer of V-ADD-3, the attribute of V-ADD-3 is set at "0," as illustrated in FIG. 27. In other words, writing for V-ADD-0, V-ADD-2 and V-ADD-3 is disabled, and writing for V-ADD-1 is enabled. When writing takes place for V-ADD-0 during the transfer of V-ADD-3, the physical address of V-ADD-0 is updated from P-ADD-a to a new memory space (P-ADD-e, in this example), and the attribute of the same is set at "1," as illustrated in FIG. 28. In response to this writing, the dirty bit of V-ADD-1 described in the memory space update table 441 is set at "1," and the number of dirty pages at t0 described in the dirty page number management table 442 is set at "2."

As a result, the information on the virtual addresses of the dirty pages can easily be understood by confirming the memory spaces having the dirty bits set at "1" in the memory space update table (V-ADD-0 and V-ADD-1, in this example), after the end of the transfer of the four memory spaces of V-ADD-0, V-ADD-1, V-ADD-2 and V-ADD-3. Moreover, the number of dirty pages generated in each unit time can easily be understood by referring to the number of pages described in the dirty page number management table.

[Error Process 2]

Figure 29:
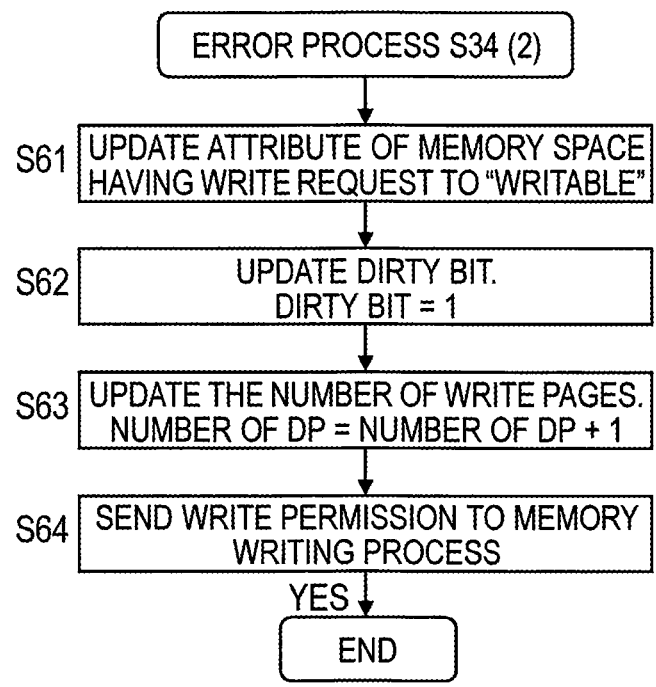
FIG. 29 is a flowchart for explaining the second error process S34.

FIG. 29 is a flowchart for explaining the second error process S34. The first error process described with reference to FIG. 22 allocates a new memory space when a write request is generated for an unwritable memory space, and executes writing on the new memory space. The second error process illustrated in FIG. 29, on the other hand, updates an unwritable memory space to a writable state (cancels the write-prohibited state of the memory space) when a write request is generated for the unwritable memory space, and executes writing on the memory space that is updated to the writable state.

In the error process illustrated in FIG. 29, the migration processing unit 450 updates the attribute of the memory space described in the memory allocation table 421 to "writable," the memory space having a write request (S61).

In other words, the migration processing unit 450 permits writing on the memory space having the write request, without allocating a new memory space as is performed in the error process illustrated in FIG. 22. The migration processing unit 450 then updates the dirty bits described in the memory space update table 441 to "1" (S62), adds "1" to the number of pages described in the dirty page number management table 442 (S63), and sends write permission to the memory writing process after the process from S62 to S63 (S64). The details of these steps are the same as those of the error process illustrated in FIG. 22.

As a result, the resources such as the memories required for allocating new memory spaces can be conserved since it is not necessary to allocate a new memory space. In addition, when transferring dirty pages, only the memory spaces having the dirty bits thereof set at "1" need to be transferred by reference to the memory space update table 441, making the transfer process simple.

As with the error process illustrated in FIG. 22, in the error process illustrated in FIG. 29, when further writing occurs on the new memory space that is updated to "writable," the result of S33 in the memory writing process becomes NO, whereby the writing is executed in place of the error process. In other words, the memory write restriction process described hereinbelow is executed only for the first writing that takes place on each of the memory spaces in process of transfer or each of the already transferred memory spaces (each memory space whose attribute described in the memory allocation table 421 is set as "unwritable").

[Memory Write Restriction Process]

Figure 30:
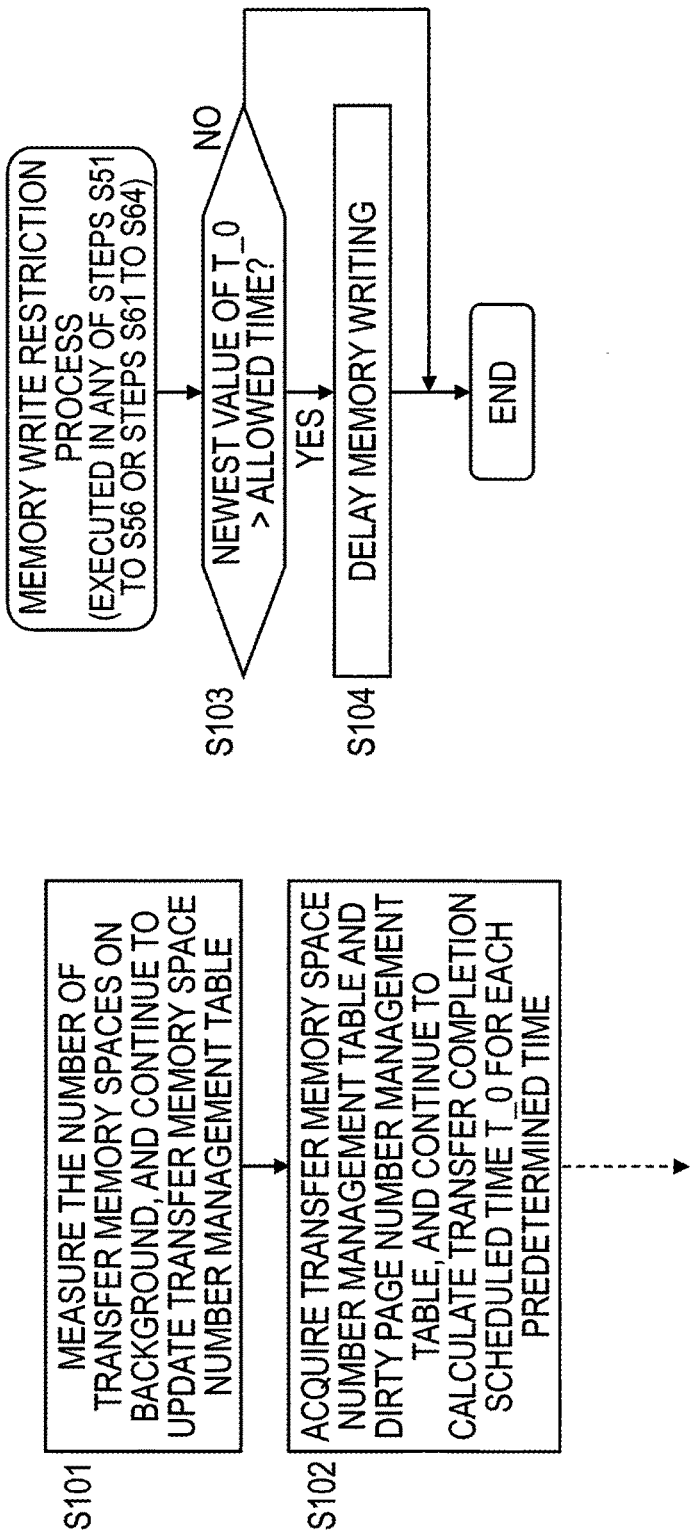
FIG. 30 is a flowchart for explaining the memory write restriction process.

FIG. 30 is a flowchart for explaining the memory write restriction process. The memory write restriction process delays any of the steps of the error process S34 illustrated in FIG. 21 when the transfer completion scheduled time T_0 calculated for the transfer process S3 exceeds the predetermined allowed time. In other words, in a case where the transfer completion scheduled time T_0 exceeds the allowed time, it is determined that there is not enough bandwidth required for the migration, restricting the writing to be executed on the memory contents of the migration source virtual machine. Specifically, the error process S34 imposes a restriction such as delaying at least some of the steps S51 to S56 of the error process illustrated in FIG. 22 or at least some of the steps S61 to S64 of the error process illustrated in FIG. 29.

For example, the error process illustrated in FIG. 22 executes the memory write restriction process when a new memory space is allocated (S51) or when write permission is sent to the memory writing process (S56). The error process illustrated in FIG. 29 alternatively executes the memory write restriction process when the attribute of the memory space having the write request is updated to "writable" (S61) or when write permission is sent to the memory writing process (S64). Thus, in a case where the transfer completion scheduled time T_0 exceeds the allowed time, the error process S34 can be delayed, further delaying the writing process. As a result, frequent generation of dirty pages in a unit time can be prevented, thus reducing the transfer time required for the transfer process S3 (or the transfer completion scheduled time T_0). The memory write restriction process is described hereinafter with reference to FIG. 30.

First, the virtualization software 4 on the background measures the number of memory spaces transferred every unit time and stores the measured number of memory spaces in the transfer memory space number management table 443 (S101). The virtualization software 4 then acquires the number of transferred memory spaces that is stored in the transfer memory space number management table 443 and the number of dirty pages to be newly transferred that is stored in the dirty page number management table 442, and calculates the transfer completion scheduled time T_0 corresponding to the memory contents of the virtual machine at every predetermined time (S102). The calculation of the transfer completion scheduled time T_0 has already been described in detail with reference to FIG. 16; thus the description thereof is omitted.

The virtualization software 4 also acquires the newest value (the most recently calculated value) from the transfer completion scheduled times T_0 calculated in S102, and compares the newest value with the predetermined allowed time (S103). It is preferred that the transfer completion scheduled time T_0 be calculated as frequently as possible, at least at every unit time. The allowed time can be changed even in the middle of the transfer process.

When the transfer completion scheduled time T_0 is below the allowed time as a result of the comparison in S103 (NO in S103), the write restriction process is ended, and the procedure returns to the error process S34. When, on the other hand, the transfer completion scheduled time T_0 exceeds the allowed time (YES in S103), the memory writing is delayed (S104). Delaying the memory writing is described in detail with reference to FIGS. 31 to 34.

[Memory Writing Delay Process 1]

Figure 31:
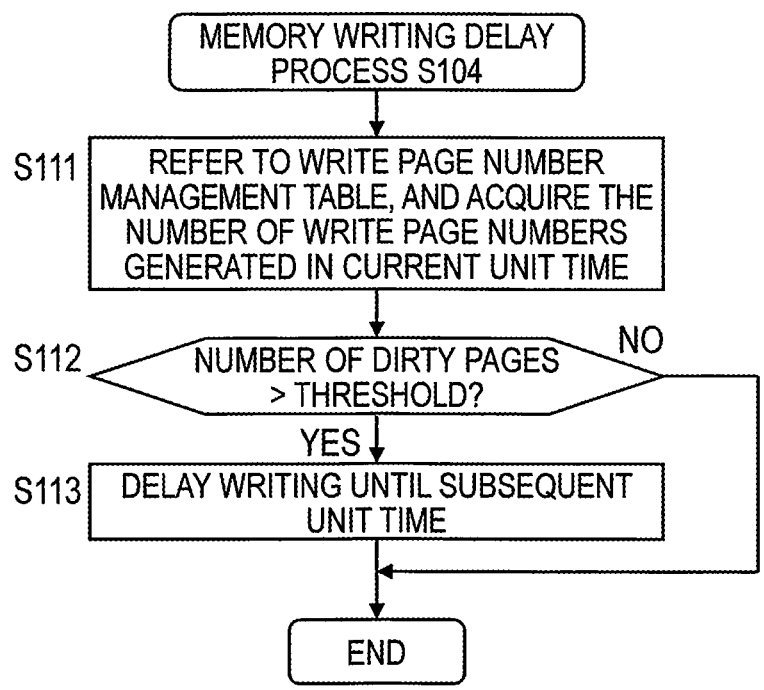
FIG. 31 is a flowchart for explaining the memory write restriction process S104.

The memory writing delay process S104 is now described. FIG. 31 is a flowchart for explaining the memory write delay process S104. When the number of dirty pages generated within a unit time exceeds a predetermined threshold, the memory writing delay process S104 restricts the writing that is executed subsequently within the unit time. Specific details of the memory writing delay process S104 are described hereinafter.

The migration processing unit 450 first acquires, from the dirty page number management table 442, the number of pages generated within a current unit time (S111). The number of dirty pages acquired in S111 is then compared with a predetermined threshold (S112). This threshold value is obtained based on, for example, the most recently calculated number of transferred memory spaces stored in the transfer memory space number management table 443. This threshold value is obtained by setting the number of memory spaces where writing is allowed to be performed in a unit time, in response to the most recent number of transferred memory spaces obtained within a unit time, in order to ensure the effective transfer memory spaces per unit time which are illustrated in FIG. 16. Therefore, for instance, in a case where "4" effective transfer memory spaces per unit time needs to be secured, the value obtained by subtracting "4" from the most recent number of transferred memory spaces may be used as the threshold. The threshold increases when the number of effective transfer memory spaces per unit time is large, but decreases when the number of effective transfer memory spaces per unit time is small. The following describes the example where "4" effective transfer memory spaces in a unit time needs to be ensured.

FIGS. 32 and 33 are diagrams each illustrating an example of the dirty page number management table and the transfer memory space number management table. The process of S112 is described with reference to FIGS. 32 and 33. FIGS. 32 and 33 are each an example illustrating the dirty page number management table 442 and transfer memory space number management table 443 in each of which adding up is performed for the unit time $t_3$. In FIG. 32, because the transferred pages are added up for the unit time $t_3$ according to the transfer memory space number management table 443, the number of transferred pages cannot be used to calculate the threshold. Thus, the threshold is calculated based on value "11" which is the number of transferred memory spaces obtained at the unit time $t_2$ closest to the unit time $t_3$. In this case, value "7" is obtained by subtracting "4" from the number of transferred pages "11" corresponding to the unit time $t_2$ and then set as the threshold. Because the number of dirty pages corresponding to the unit time $t_3$ of the dirty page number management table 442 is "2," the result of S112 is NO until the number of dirty pages becomes "7." However, when the number of dirty pages in the dirty page number management table exceeds "7" as illustrated in FIG. 33, the result of S112 corresponding to the subsequent writing process becomes YES.

Returning to FIG. 31, when the number of dirty pages obtained in the current unit time exceeds the threshold (YES in S112), the execution of writing is delayed until the next unit time (S113). Specifically, as illustrated in FIG. 33, because the number of dirty pages described in the dirty page number management table is "9," which exceeds the value "7" set as the threshold, the execution of writing is delayed until the next unit time. On the other hand, when the number of dirty pages obtained in the current unit time is below the threshold (NO in S112), the execution of writing is not delayed.

When the number of dirty pages generated in a unit time exceeds the threshold, the process described above can restrict the subsequent writing that occurs in the unit time. As a result, the transfer time required for the transfer process S3 can be made short. Writing that is delayed until the next unit time may be processed at the beginning of the next unit time. When writing that is delayed until the next unit time takes place multiple times, control may be performed by introducing queues to be stored in the order in which the write requests are generated, in order to execute the process in the order in which the write requests are generated.

[Memory Writing Delay Process 2]

Figure 34:
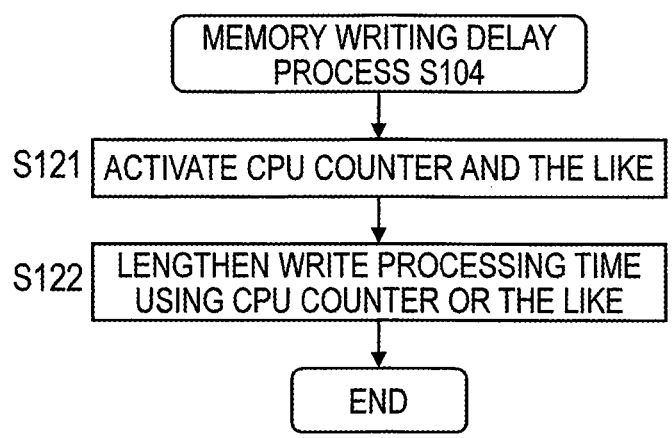
FIG. 34 is a flowchart for explaining the memory write restriction process S104.

The memory writing delay process S104 is now described. FIG. 34 is a flowchart for explaining the memory write delay process S104. The memory writing delay process S104 illustrated in FIG. 31 compares the number of dirty pages generated in the current unit time with the threshold, and delays the execution of writing when the number of dirty pages generated in the current unit time exceeds the threshold. The memory writing delay process S104 illustrated in FIG. 34, on the other hand, sets the time required for each of all writing processes to be longer than when write restriction is not imposed. As a result, in a case where writing processes concentrically take place in a certain time zone, these writing processes can be spread and executed in other time zones.

The migration processing unit 450 activates a CPU counter (S121), and lengthens the write processing time by using the CPU counter (S122). FIG. 34 assumes that the CPU counter, a function of the group of hardware 5 of the virtual machine, is used in order to delay a writing process; however, a writing process may be delayed by using other types of software. By setting the write processing time to be longer than a normal processing time by the length of a unit time, writing may certainly be executed in a subsequent unit time.

[Final Transfer Data Transfer Process]

The final transfer data transfer process (S5) that is executed after completion of the memory content transfer process (S3) is further described with reference to FIG. 5. After completion of the memory content transfer process (S3), the migration source virtual machine is suspended (S4), and the final transfer data transfer process (S5) is executed until the destination virtual machine is resumed (S6). From the time when the migration source virtual machine is suspended to the time when the destination virtual machine is resumed, the virtual machines remain stopped. For this reason, the virtual machines need to remain stopped for as short time as possible.

The time period between when the migration source virtual machine is suspended and when the destination virtual machine is resumed (referred to as "virtual machine stop time T_1," hereinafter) can be obtained by dividing the final transfer data by the data transfer rate obtained after the migration source virtual machine is suspended. In other words, the virtual machine stop time T_1 is calculated by the following formula (5).

$$\text{Virtual machine stop time } T\_1 = \text{Final transfer data} / \text{Data transfer rate after suspension} \quad (5)$$

Because writing does not take place in the migration source virtual machine during the virtual machine stop time T_1, effective transfer memory spaces described in FIG. 16 can be secured sufficiently, compared to in the memory transfer process S3 executed prior to suspending the migration source virtual machine. On the other hand, in a case where the migration source virtual machine is suspended when the amount of final transfer data is large (when there are more untransferred dirty pages remaining), the virtual machines are stopped for a long time due to the large amount final transfer data.

[Transfer Completion Scheduled Time T_N in Case of Compressing Dirty Pages]

Figure 35:
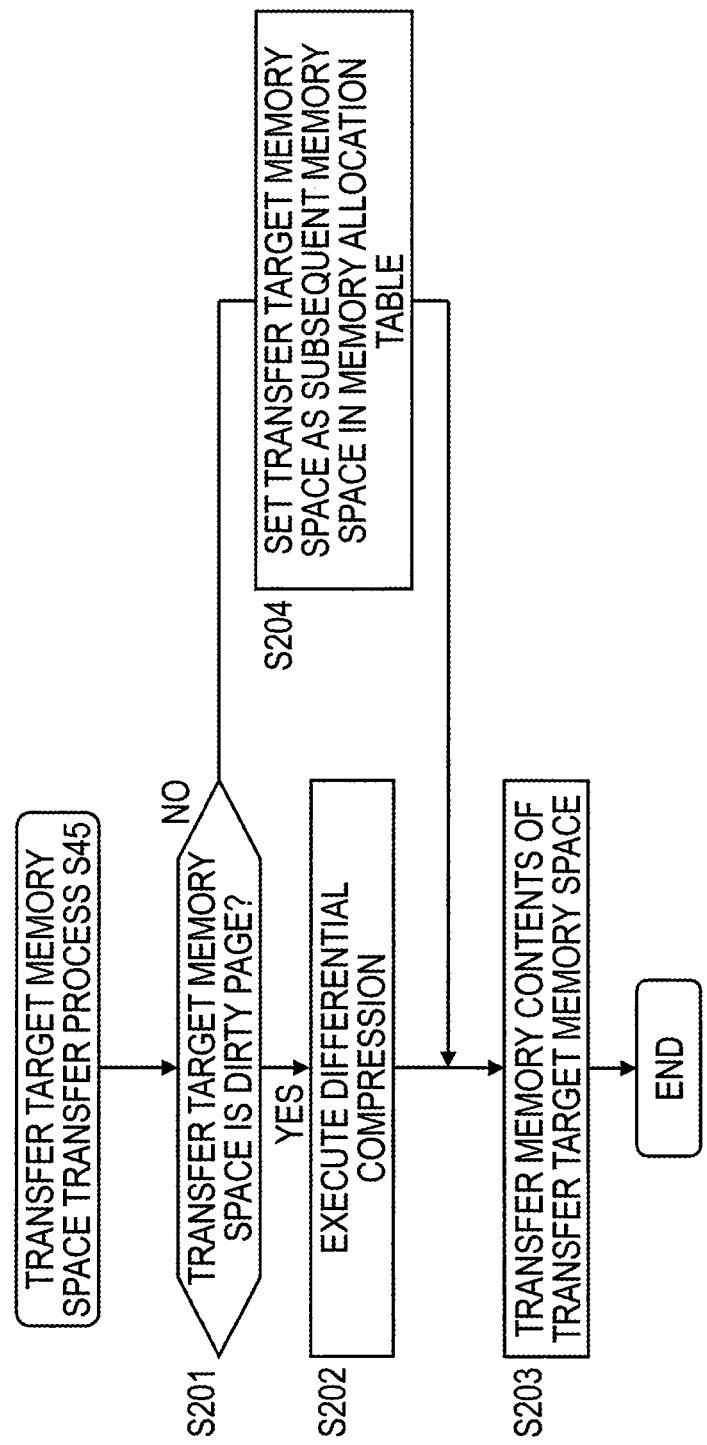
FIG. 35 is a flowchart for explaining the transfer target memory space transfer process S45 that is executed when differential compression is performed.

FIG. 35 is a flowchart for explaining the transfer target memory space transfer process S45 that is executed when differential compression is performed. As illustrated in FIG. 35, the memory contents of the transfer target memory space may be compressed and then transferred in the memory transfer process S3. In other words, when the difference between the amount of previously transmitted data and the number of dirty pages is small, the bit distribution of the difference data is inclined toward "0." Thus, the difference data can be compressed significantly. Therefore, in a case where the difference between the amount of previously transmitted data and the number of dirty pages is small, the dirty pages can be compressed significantly and then transferred. The following describes specific details of the transfer target memory space transfer process S45 that is executed when differential compression is performed.

As illustrated in FIG. 35, it is determined whether the transfer target memory space is a dirty page or not (S201). When the transfer target memory space is a dirty page, differential compression is executed (S202), and then the transfer target memory space is transferred (S203). However, when the transfer target memory space is not a dirty page, the transfer target memory space is transferred without executing the differential compression (S204). Through the execution of this differential compression, the amount of data to be transferred can be reduced, thus shortening the transfer completion scheduled time (the transfer completion scheduled time when the differential compression is performed is referred to as "transfer completion scheduled time T_N" hereinafter). Note that the transfer completion scheduled time T_N can be calculated by the following formula (6).

$$\text{Transfer completion scheduled time } T\_N = (\text{Difference data compression rate} \times \text{Number of dirty pages} + \text{Number of memory spaces other than dirty pages}) \times \text{Amount of data per memory space} - \text{Amount of final transfer data}) / \text{Data transfer rate} \quad (6)$$

In the formula (6), the data transfer rate can be calculated in the same manner as the data transfer rate described in the foregoing formula (2) or (3).

Because the final transfer data are configured by the data and contexts corresponding to the dirty pages remaining in the memory of the migration source virtual machine, the differential compression can be performed with respect to the dirty pages generated in the virtual machine stop time T_1. Therefore, the virtual machine stop time T_1 can be shortened by using this differential compression.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system, comprising:
a plurality of physical machines, in each of which a virtual machine is constructed; and
a migration processing unit that executes a migration process for moving a migration source virtual machine, constructed on a migration source physical machine, onto a migration destination physical machine during operation of the migration source virtual machine,
the migration processing unit includes a memory data transfer processing unit that transfers first data stored in a first memory of the migration source virtual machine from the first memory to a second memory of the migration destination physical machine, transfers second data, which is written in the first memory during transferring the first data, from the first memory to the second memory, calculates the number of effective transfer memory spaces generated within the unit time by subtracting the number of write memory spaces of the first memory in which writing has taken place within the unit time, from the number of transfer memory spaces generated within the unit time when transferring the first or second data from the first memory to the second memory, calculates a transfer completion scheduled time by dividing the amount of the first data and the second data by the number of effective transfer memory spaces, and when the transfer completion scheduled time for the first and second data is a time longer than an allowed time, restricts writing the second data in the first memory.

2. The information processing system according to claim 1, wherein the memory data transfer processing unit restricts the writing by delaying the writing until a subsequent unit time when the number of memory spaces in the first memory on which writing has been executed within a unit time exceeds a threshold.

3. The information processing system according to claim 1, wherein the memory data transfer processing unit restricts the writing by making a processing time required for the writing longer than a time required when the writing is not restricted.

4. The information processing system according to claim 1, wherein the memory data transfer processing unit restricts an initial writing that is executed on each of memory locations at which the first data and second data are stored prior to migration to the destination physical machine.

5. The information processing system according to claim 4, wherein
the memory data transfer processing unit establishes a write-prohibited state for a memory space of the first memory that is in process of transfer or already transferred, outputs an error when a write request is generated for the write-prohibited memory space, secures a writable memory space in response to the error output, and executes writing on this memory space, and
the memory data transfer processing unit restricts the writing by delaying at least a part of the process between securing the writable memory space and executing writing on this memory space until a subsequent unit time when the number of memory spaces in the first memory in which writing has taken place within a unit time exceeds a threshold.

6. The information processing system according to claim 5, wherein the memory data transfer processing unit secures the writable memory space by allocating a new memory space.

7. The information processing system according to claim 5, wherein the memory data transfer processing unit secures the writable memory space by cancelling the write-prohibited state to make this canceled memory space writable.

8. The information processing system according to claim 5, wherein the memory data transfer processing unit restricts the writing by delaying allocation of the new memory space until a subsequent unit time.

9. The information processing system according to claim 5, wherein the memory data transfer processing unit restricts the writing by delaying writing into the new memory space until a subsequent unit time.

10. The information processing system according to claim 4, wherein
the memory data transfer processing unit establishes a write-prohibited state for a memory space of the first memory that is in process of transfer or already transferred, outputs an error when a write request is generated for the write-prohibited memory space, secures a writable memory space in response to the error output, and executes writing on this memory space, and
the memory data transfer processing unit restricts the writing by making a processing time required at least for a part of the process between securing the writable memory space and executing writing on this memory space, longer than a time required when the writing is not restricted.

11. The information processing system according to claim 10, wherein the memory data transfer processing unit restricts the writing by lengthening a processing time required for allocating the new memory space.

12. The information processing system according to claim 10, wherein the memory data transfer processing unit restricts the writing by lengthening a processing time required for writing into the new memory space.

13. The information processing system according to claim 1, further comprising:
a transferred memory space number measuring unit that measures the number of transfers within a unit time when transferring the first or second data from the first memory to the second memory,
wherein the memory data transfer processing unit works out the transfer completion scheduled time by calculating the number of effective transfer memory spaces generated within the unit time by subtracting the number of write memory spaces of the first memory in which writing has taken place within the unit time, from the number of transfer memory spaces generated within the unit time which is measured by the transferred memory space number measuring unit, and by dividing the amount of the first data by the number of effective transfer memory spaces.

14. The information processing system according to claim 1, wherein the memory data transfer processing unit calculates the transfer completion scheduled time as a time it takes for an amount of the second data in the first memory to fall below a reference value after transfer of the first data is started.

15. A non-transitory computer readable storage medium that stores therein a migration processing program for causing a computer to execute a migration process comprising:
moving a migration source virtual machine, constructed on a migration source physical machine, onto a migration destination physical machine during operation of the migration source virtual machine;
the moving the migration source virtual machine includes,
transferring first data stored in a first memory of the migration source virtual machine from the first memory to a second memory of the migration destination physical machine,
transferring second data which is written in the first memory during transferring the first data, from the first memory to the second memory,
calculates the number of effective transfer memory spaces generated within the unit time by subtracting the number of write memory spaces of the first memory in which writing has taken place within the unit time, from the number of transfer memory spaces generated within the unit time when transferring the first or second data from the first memory to the second memory,
calculates a transfer completion scheduled time by dividing the amount of the first data and the second data by the number of effective transfer memory spaces, and
when the transfer completion scheduled time for the first and second data is a time longer than an allowed time, restricting writing the second data in the first memory.

16. A method of a migration process comprising:
moving a migration source virtual machine, constructed on a migration source physical machine, onto a migration destination physical machine during operation of the migration source virtual machine,
the moving the migration source virtual machine includes,
transferring first data stored in a first memory of the migration source virtual machine from the first memory to a second memory of the migration destination physical machine,
transferring second data which is written in the first memory during transferring the first data, from the first memory to the second memory,
calculates the number of effective transfer memory spaces generated within the unit time by subtracting the number of write memory spaces of the first memory in which writing has taken place within the unit time, from the number of transfer memory spaces generated within the unit time when transferring the first or second data from the first memory to the second memory, calculates a transfer completion scheduled time by dividing the amount of the first data and the second data by the number of effective transfer memory spaces, and when the transfer completion scheduled time for the first and second data is a time longer than an allowed time, restricting writing the second data in the first memory.

* * * * *